(12) United States Patent
Mitsuyasu

(10) Patent No.: US 10,048,462 B2
(45) Date of Patent: Aug. 14, 2018

(54) MANUFACTURING METHOD OF IMAGING MODULE

(71) Applicant: FUJIFILM Corporation, Tokyo (JP)

(72) Inventor: Takashi Mitsuyasu, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 15/135,142

(22) Filed: Apr. 21, 2016

(65) Prior Publication Data

US 2016/0231529 A1    Aug. 11, 2016

Related U.S. Application Data

(63) Continuation of application No. PCT/JP2014/077847, filed on Oct. 20, 2014.

(30) Foreign Application Priority Data

Oct. 22, 2013    (JP) ................. 2013-219245

(51) Int. Cl.
*G01R 31/28*    (2006.01)
*G02B 7/09*    (2006.01)
(Continued)

(52) U.S. Cl.
CPC .............. *G02B 7/09* (2013.01); *G02B 7/021* (2013.01); *G02B 27/32* (2013.01); *G02B 27/62* (2013.01);
(Continued)

(58) Field of Classification Search
CPC ............ G03F 7/70758; G03F 7/70325; G03F 7/70725; G03F 7/70258; G03F 7/70833;
(Continued)

(56) References Cited

U.S. PATENT DOCUMENTS 5,557,357 A    9/1996 Soshi et al.
5,614,974 A    3/1997 Soshi et al.
(Continued)

FOREIGN PATENT DOCUMENTS

JP    60-189850 U    12/1985
JP    61-102616 A    5/1986
(Continued)

OTHER PUBLICATIONS

International Search Report, issued in PCT/JP2014/077847, dated Jan. 20, 2015.
(Continued)

*Primary Examiner* — Thiem Phan
(74) *Attorney, Agent, or Firm* — Birch, Stewart, Kolasch & Birch, LLP

(57) ABSTRACT

A manufacturing method of an imaging module and an imaging module manufacturing apparatus capable of performing positioning of an imaging element unit and a lens unit with high accuracy are provided. A manufacturing apparatus 200 holds a lens unit 10 and an imaging element unit 20 on a Z axis, and images a measurement chart by an imaging element 27 in a state where a probe 113*a* comes into contact with each of terminals 14A to 14F electrically connected to an x-direction VCM 16A, a y-direction VCM 16C, and a z-direction VCM 16E of the lens unit 10 and electricity flows to a lens drive unit 16 inside the lens unit 10. A contactor of the probe 113*a* is configured of a non-magnetic material.

10 Claims, 12 Drawing Sheets

(51) Int. Cl.

| | | |
|---|---|---|
| *G03B 5/00* | (2006.01) | |
| *G02B 7/02* | (2006.01) | |
| *G02B 27/32* | (2006.01) | |
| *G02B 27/62* | (2006.01) | |
| *H04N 5/225* | (2006.01) | |
| *G03B 3/10* | (2006.01) | |
| *H04N 17/00* | (2006.01) | |
| *G06T 7/73* | (2017.01) | |

(52) U.S. Cl.
CPC ............... *G03B 3/10* (2013.01); *G03B 5/00* (2013.01); *G06T 7/73* (2017.01); *H04N 5/2253* (2013.01); *H04N 5/2254* (2013.01); *H04N 5/2257* (2013.01); *H04N 17/002* (2013.01); *G03B 2205/0015* (2013.01); *G06T 2207/30108* (2013.01); *G06T 2207/30204* (2013.01); *Y10T 29/49004* (2015.01)

(58) Field of Classification Search
CPC .............. G03F 7/70191; G03F 9/7019; G03B 2205/0015; G03B 5/00; Y10T 29/49004; Y10T 74/20201; H04N 5/2254
USPC ..... 29/593, 407.01, 528, 595; 359/554, 557, 359/676, 689
See application file for complete search history.

(56) References Cited

U.S. PATENT DOCUMENTS

| 5,708,865 | A | | 1/1998 | Soshi et al. | |
|---|---|---|---|---|---|
| 8,837,929 | B2 | * | 9/2014 | Nomura | ............... G02B 27/646 348/208.11 |
| 9,568,705 | B2 | * | 2/2017 | Sekimoto | ............... G02B 7/021 |
| 2005/0068634 | A1 | | 3/2005 | Miyatake et al. | |
| 2009/0180021 | A1 | | 7/2009 | Kikuchi et al. | |
| 2011/0022820 | A1 | | 1/2011 | Bunyk et al. | |
| 2013/0005580 | A1 | | 1/2013 | Bunyk et al. | |
| 2013/0314810 | A1 | | 11/2013 | Sekimoto et al. | |
| 2014/0329687 | A1 | | 11/2014 | Bunyk et al. | |
| 2016/0019468 | A1 | | 1/2016 | Bunyk et al. | |
| 2016/0314407 | A1 | | 10/2016 | Bunyk et al. | |

FOREIGN PATENT DOCUMENTS

| JP | 6-114055 A | 4/1994 |
|---|---|---|
| JP | 7-281233 A | 10/1995 |
| JP | 2005-9925 A | 1/2005 |
| JP | 2008-145662 A | 6/2008 |
| JP | 2008-226345 A | 9/2008 |
| JP | 2009-210443 A | 9/2009 |
| JP | 2010-21985 A | 1/2010 |
| JP | 2011-524026 A | 8/2011 |
| JP | 2012-122905 A | 6/2012 |
| JP | 2012-256017 A | 12/2012 |
| WO | WO 03/085440 A1 | 10/2003 |
| WO | WO 2012/108247 A1 | 8/2012 |

OTHER PUBLICATIONS

Written Opinion of the International Searching Authority, issued in PCT/JP2014/077847, dated Jan. 20, 2015.
Japanese Office Action and English translation thereof, dated Oct. 4, 2016, for corresponding Japanese Application No. 2015-543845.
Japanese Office Action dated Apr. 25, 2017 for Japanese Application No. 2015-543845, together with an English translation.
Written Opinion dated Jan. 20, 2015 issued in PCT/JP2014/077847 (Forms PCT/ISA/237, PCT/IB/338 and PCT/IB/373).

* cited by examiner

MANUFACTURING METHOD OF IMAGING MODULE

CROSS REFERENCE TO RELATED APPLICATION

This is a continuation of International Application No. PCT/JP2014/077847 filed on Oct. 20, 2014, and claims priority from Japanese Patent Application No. 2013-219245 filed on Oct. 22, 2013, the entire disclosures of which are incorporated herein by reference.

BACKGROUND OF THE INVENTION

1. Field of the Invention

The present invention relates to a manufacturing method of an imaging module and an imaging module manufacturing apparatus.

2. Description of the Related Art

A small and thin imaging module is mounted on a portable electronic device such as a portable phone having an imaging function. The imaging module has a structure in which a lens unit, into which an imaging lens is incorporated, and an imaging element unit into which an imaging element such as a CCD image sensor or a CMOS image sensor is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A discloses the imaging module having the AF mechanism. In addition, JP2012-256017 discloses the imaging module having the AF mechanism and the optical type image blur correction mechanism.

In recent years, in an imaging element which is used in an imaging module, not only imaging elements having a low pixel number such as approximately one million pixels to two million pixels but also imaging elements having a high pixel number such as three million pixels to ten million pixels or more are widely used.

In a case where the imaging element of a low pixel number is used, particularly, high accuracy is not required for positioning of the lens unit and the imaging element unit. However, in a case where the imaging element having a high pixel number is used, high accuracy is required for the positioning.

JP2010-21985A discloses a technology in which the lens unit and the imaging element unit are fixed to each other after the positioning of the lens unit and the imaging element unit is performed.

In JP2010-21985A, after the lens unit and the imaging element unit are set to an initial position, in a state where a probe comes into contact with the lens unit and electricity flows to the lens unit, a chart is imaged by the imaging element while the imaging element unit moves in a direction of an optical axis, and the positions of the lens unit and the imaging element unit are adjusted from the obtained captured image. After the adjustment, the lens unit and the imaging element unit are bonded and fixed to each other.

JP2012-256017A discloses that a pseudo sensor cover formed of a non-magnetic body is used so as to position a lens barrel in a lens unit when the lens unit is manufactured before the lens unit and an imaging element unit are fixed to each other.

JP2009-210443A and JP2012-122905A disclose that a contact probe formed of a non-magnetic material such as beryllium copper is used as an inspection contact probe used for conduction testing of an electronic component.

SUMMARY OF THE INVENTION

As in JP2012-256017A, in an imaging module having an optical type image blur correction mechanism, a lens barrel included in a lens unit is configured so as to be movable in a direction perpendicular to an optical axis. In addition, in a case where a voice coil motor (VCM) is used as an actuator, a permanent magnet is included in the optical type image blur correction mechanism. Accordingly, when the lens unit and the imaging element unit are positioned, since an attractive force is generated between the permanent magnet included in the lens unit and a magnetic body of a device side, it is necessary to prevent deviation of a lens optical axis inside the lens unit.

JP2012-256017A discloses that a tool used for manufacturing the lens unit is formed of a non-magnetic body such that an attractive force is not generated between the permanent included in the lens unit and the tool when the lens unit is manufactured. However, in JP2012-256017A, occurrence of the deviation in the lens optical axis in a process, in which the lens unit and the imaging element unit are positioned after the lens unit is manufactured, is not considered.

The present invention is made in consideration of the above-described circumstances, and an object thereof is to provide a manufacturing method of an imaging module and an imaging module manufacturing apparatus capable of accurately determining a position of an imaging element when the imaging element unit and a lens unit are positioned so as to improve imaging quality.

According to an aspect of the present invention, there is provided a manufacturing method of an imaging module having a lens unit which has a lens group, and an imaging element unit which is fixed to the lens unit and has an imaging element which images a subject through the lens group, in which the lens unit has a lens drive unit which includes two lens driving units which respectively move at least a portion of lenses of the lens group in two directions orthogonal to an optical axis of the lens group, a housing which accommodates the lens group and the lens drive unit, and an electric connection portion which is exposed from the housing and is electrically connected to the lens drive unit, the two lens driving units have voice coils and magnets facing the voice coils, and the manufacturing method comprises: a first process of, on an axis orthogonal to a measurement chart, changing relative positions of at least one or more of the imaging element unit, the lens unit, and the measurement chart in the direction of the axis, and driving the imaging element and imaging the measurement chart through the lens group by the imaging element at each relative position; and a second process of adjusting at least an inclination of the imaging element unit with respect to the lens unit based on imaging signals obtained by imaging the measurement chart by the imaging element, and fixing the imaging element unit to the lens unit, and in the first process, the lens unit is held on the axis, and the measurement chart is imaged by the imaging element in a state where a contactor of a first probe having the contactor including a main body formed of a non-magnetic material is pressed to the electric connection portion of the lens unit and electricity flows to the lens drive unit.

According to another aspect of the present invention, there is provided an imaging module manufacturing apparatus, comprising: a measurement chart installation portion for installing a measurement chart; an imaging element unit holding portion for holding an imaging element unit having an imaging element which images a subject through a lens unit having a lens group, on an axis orthogonal to the measurement chart installed on the measurement chart installation portion; a lens unit holding portion for holding the lens unit on the axis between the measurement chart installation portion and the imaging element unit holding portion; a first probe pressing portion which presses a contactor of a first probe having the contactor including a main body formed of a non-magnetic material to the lens unit held by the lens unit holding portion; a control unit which changes relative positions of at least one or more of the measurement chart installation portion, the lens unit holding portion, and the imaging element unit holding portion in the direction of the axis, and drives the imaging element of the imaging element unit and images the measurement chart through the lens unit by the imaging element at each relative position; an adjustment portion which adjusts at least an inclination of the imaging element unit with respect to the lens unit based on imaging signals obtained by imaging the measurement chart by the imaging element; and a unit fixing portion which fixes the imaging element unit adjusted by the adjustment portion to the lens unit.

According to the present invention, it is possible to provide a manufacturing method of an imaging module and an imaging module manufacturing apparatus capable of accurately determining a position of an imaging element when the imaging element unit and a lens unit are positioned so as to improve imaging quality.

BRIEF DESCRIPTION OF THE DRAWINGS

FIG. 8 is a view showing a detailed configuration example of a contactor of a probe 113a.

EXPLANATION OF REFERENCES

Figure 1:
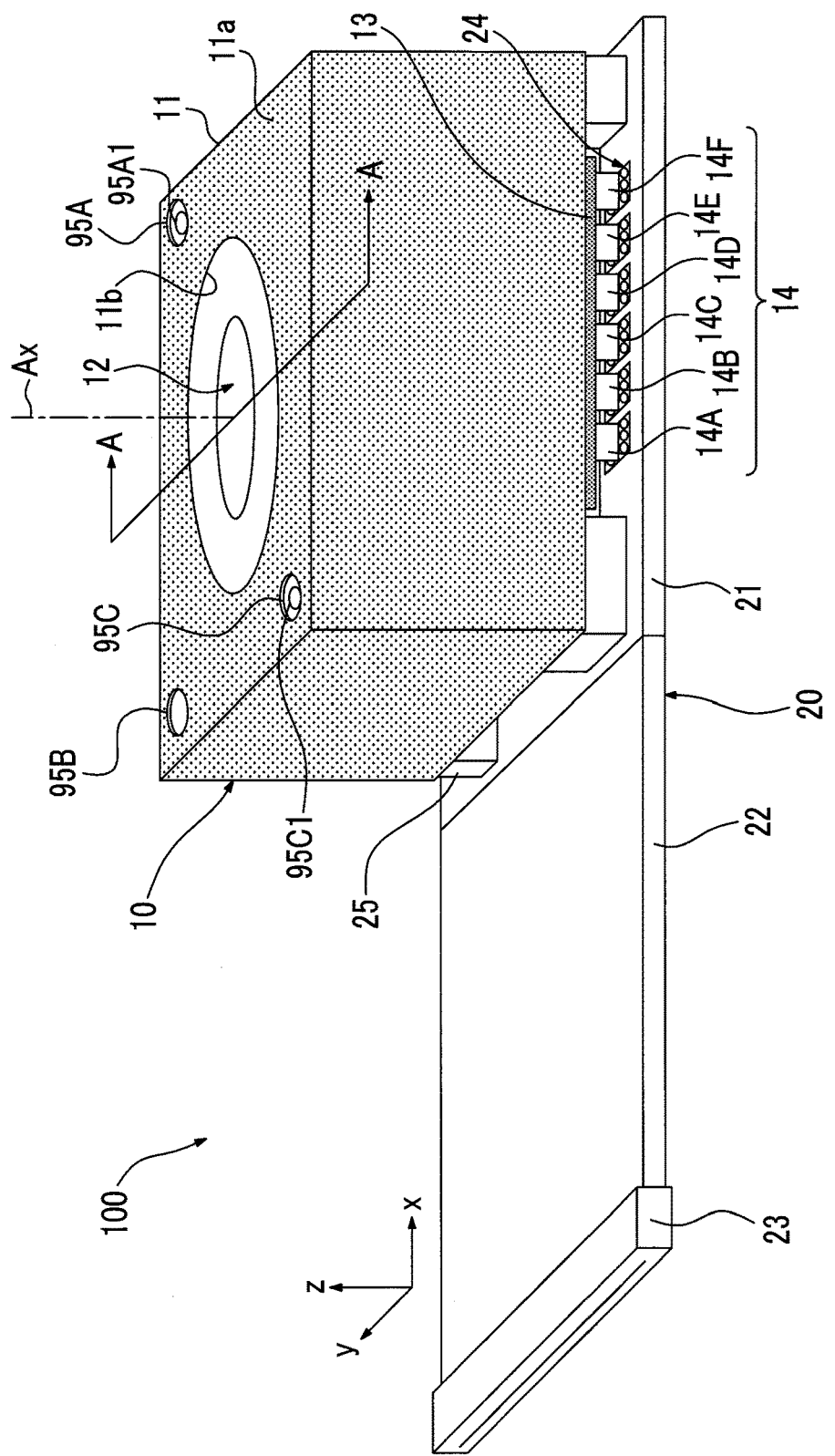
FIG. 1 is an external perspective view of an imaging module 100.

100: imaging module
10: lens unit
11: housing
12: lens group
13: flexible substrate
14: lens unit terminal portion
14A to 14F: terminal
16: lens drive unit
160: base
161: z-direction voice coil
162: z-direction magnet
163, 166: spring
164: x-direction voice coil, y-direction voice coil
165: x-direction magnet, y-direction magnet
16A: x-direction VCM
16B: x-direction hall element
16C: y-direction VCM
16D: y-direction hall element
16E: z-direction VCM
16F: z-direction hall element
20: imaging element unit
21: substrate
22: flexible substrate
23: external connection terminal portion
24: imaging element unit terminal portion
24A to 24F: terminal
27: imaging element
200: imaging module manufacturing apparatus
71: chart unit
89: measurement chart
75: lens positioning plate
113: probe unit
113a: probe formed of a non-magnetic material
114: holding plate
81: adhesive supply portion
83: ultraviolet lamp
79: imaging element unit holding portion
85: control unit
Ax: optical axis
z: direction along optical axis
x: direction orthogonal to z direction
y: direction orthogonal to z direction

DESCRIPTION OF THE PREFERRED EMBODIMENTS

Hereinafter, an embodiment of the present invention will be described with reference to the drawings.

FIG. 1 is an external perspective view of an imaging module 100.

The imaging module 100 comprises a lens unit 10 which has a lens group 12, and an imaging element unit 20 which is fixed to the lens unit 10 and has an imaging element (not shown in FIG. 1) which images a subject through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 comprises a housing 11 in which components described below are accommodated.

An opening 11b which has the optical axis Ax of the lens group 12 as the center is formed on a top surface 11a of the housing 11. The imaging module 100 receives light of a subject through the lens group 12 from the opening 11b, and performs imaging.

In addition, positioning concave sections 95A, 95B, and 95C for holding the lens unit 10 to a manufacturing apparatus when the imaging module 100 is manufactured are formed on the top surface 11a of the housing 11. Concave sections 95A1 and 95C1 which are smaller than the concave sections 95A and 95C are formed on bottom surfaces of the concave sections 95A and 95C positioned on a diagonal line on the top surface 11a.

A portion of a flexible substrate 13 accommodated in the housing 11 is exposed outside the housing 11. A lens unit terminal portion 14 including terminals 14A to 14F is connected to the distal end of the exposed portion of the flexible substrate 13. The lens unit terminal portion 14 is exposed from a surface except for the top surface 11a which is the surface orthogonal to the z direction, among surfaces configuring the housing 11.

In addition, as described below, the lens unit terminal portion 14 includes other terminals in addition to the terminals 14A to 14F. However, in FIG. 1, for simplification, only the terminals 14A to 14F are shown, and other terminals are not shown.

Figure 2:
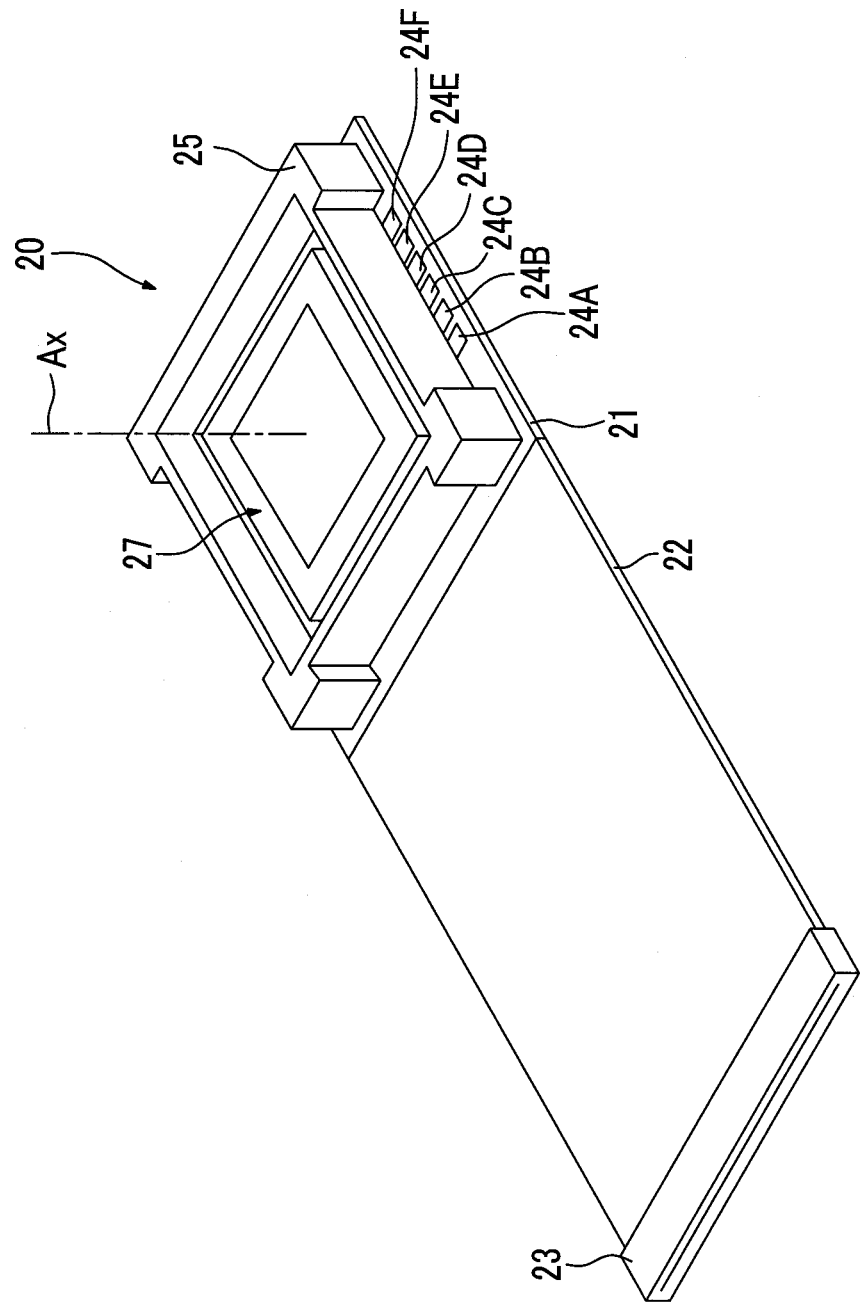
FIG. 2 is an external perspective view of an imaging element unit 20 in a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 comprises a substrate 21 on which an imaging element 27 such as a CCD image sensor or a CMOS image sensor is formed, and a flexible substrate 22 which is electrically connected to the substrate 21.

A pixel pitch of the imaging element 27 is not particularly limited. However, an imaging element having a pixel pitch of 1.0 μm or less is used as the imaging element 27. Here, the pixel pitch means the minimum distance among distances between centers of photo-electrically converted regions included in pixels provided in the imaging element 27.

In recent years, the pixel pitch of the imaging element has decreased according to an increase of a pixel number. However, if the pixel pitch decreases, an area per one pixel decreases. Accordingly, a radius of an allowable circle of confusion decreases, and a focal depth decreases. In addition, since it is necessary to increase a condensed light amount per one pixel, an F-number of the lens is likely to be decreased.

Accordingly, in recent years, since the focal depth of the imaging module is very small, it is necessary to perform positioning of the lens unit and the imaging element unit with high accuracy. Particularly, if the pixel pitch is 1 μm or less, high positioning accuracy is required.

A tubular cover holder 25 is formed on the substrate 21, and the imaging element 27 is disposed inside the cover holder 25. A cover glass (not shown) is fitted to the upper portion of the imaging element 27 in a hollow portion of the cover holder 25.

An imaging element unit terminal portion including terminals 24A to 24F for electrically connecting to the lens unit 10 is provided on the surface of the substrate 21 on the outside of the cover holder 25. Similarly to the lens unit terminal portion 14, in the imaging element unit terminal portion, only some terminals are shown.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22. The external connection terminal portion 23 functions as an electric connection portion which is electrically connected to the imaging element 27.

In addition, a lens unit wire, which is connected to each terminal included in the imaging element unit terminal portion, is provided on the substrate 21. The lens unit wire is connected to the external connection terminal portion 23, which is provided on the end portion of the flexible substrate 22, via the wire provided on the flexible substrate 22.

In a state where the lens unit 10 and the imaging element unit 20 are fixed, each terminal of the lens unit terminal portion and each terminal of the imaging element unit terminal portion corresponding to each terminal of the lens unit terminal portion are electrically connected to each other.

In FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
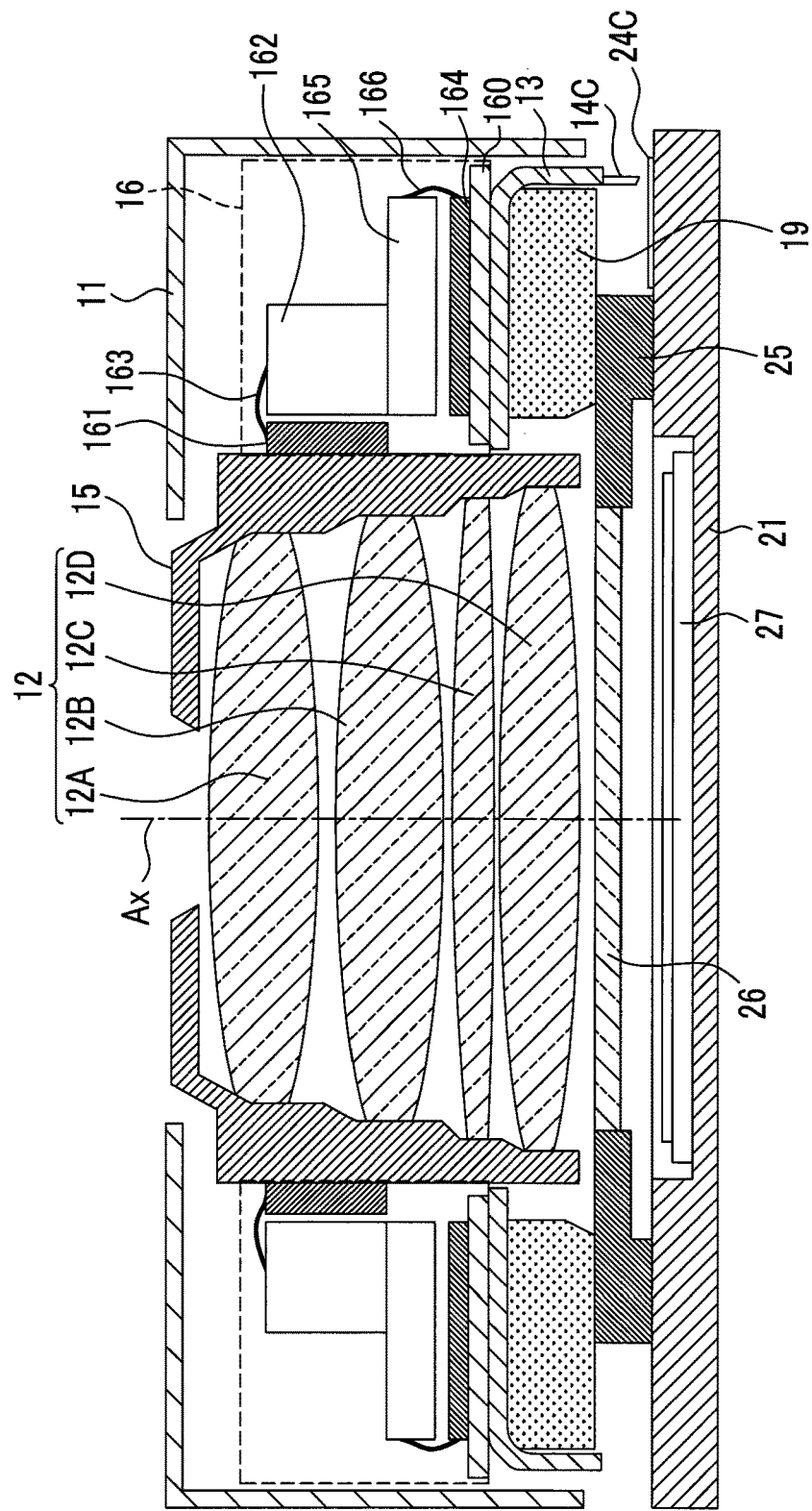
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

In addition, the lens unit 10 comprises the lens group 12 which includes a plurality of lenses (four lenses 12A to 12D in the example of FIG. 3) disposed above the cover glass 26, a tubular lens barrel 15 which supports the lens group 12, a bottom block 19 which is placed on the upper surface of the cover holder 25 of the imaging element unit 20, the flexible substrate 13 which is fixed to the bottom block 19, the lens unit terminal portions (only the terminal 14C is shown since FIG. 3 is a sectional view) which are connected to the flexible substrate 13, and a lens drive unit 16 which is formed on the flexible substrate 13.

The lens group 12, the lens barrel 15, the bottom block 19, the flexible substrate 13, and the lens drive unit 16 are accommodated in the housing 11.

The lens drive unit 16 comprises a first lens driving unit, a second lens driving unit, a third lens driving unit, and a hall element which is a position detection element for detecting the position of the lens.

The first lens driving unit is a driving unit which moves at least a portion (all lenses of the lens group 12 in the example of FIG. 3) of the lenses of the lens group 12 in a first direction (z direction in FIG. 1) along the optical axis Ax of the lens group 12 so as to perform focus adjustment.

The second lens driving unit is a driving unit which moves at least a portion (all lenses of the lens group 12 in the example of FIG. 3) of the lenses of the lens group 12 in a second direction (x direction in FIG. 1) orthogonal to the optical axis Ax of the lens group 12 so as to correct blur of an image captured by the imaging element 27.

The third lens driving unit is a driving unit which moves at least a portion (all lenses of the lens group 12 in the example of FIG. 3) of the lenses of the lens group 12 in a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, is configured of a voice coil motor (VCM).

As shown in FIG. 3, the first lens driving unit comprises a voice coil 161 which is fixed to the lens barrel 15, a magnet 162 which is provided at a position facing the voice coil 161, and a spring 163 which is fixed to each of the voice coil 161 and the magnet 162.

In addition, each of the second lens driving unit and the third lens driving unit comprises a base 160 which is fixed to the flexible substrate 13, a voice coil 164 which is fixed to the base 160, a magnet 165 which is provided at a position facing the voice coil 164 and is fixed to the magnet 162, and a spring 166 which is fixed to each of the voice coil 164 and the magnet 165. In addition, the base 160 is used both in the second lens driving unit and the third lens driving unit.

A distance between the magnet 165 and the voice coil 164 in the direction of the optical axis Ax is fixed to a constant value by the spring 166. Accordingly, if a drive current flows to the voice coil 161 configuring the first lens driving unit, in a state where the position of the magnet 162 in the direction of the optical axis Ax is fixed, the voice coil 161 and the lens barrel 15 fixed to the voice coil 161 move in the direction of the optical axis Ax.

If a drive current flows to the voice coil 164 configuring the second lens driving unit, the magnet 165 configuring the second lens driving unit and the magnet 162 fixed to the magnet 165 move in the x direction. A distance between the magnet 162 and the voice coil 161 in the direction orthogonal to the optical axis Ax is fixed to a constant value by the spring 163. Accordingly, the magnet 162 moves in the x direction, and the lens group 12 moves in the x direction.

If a drive current flows to the voice coil 164 configuring the third lens driving unit, the magnet 165 configuring the third lens driving unit and the magnet 162 fixed to the magnet 165 move in the y direction. A distance between the magnet 162 and the voice coil 161 in the direction orthogonal to the optical axis Ax is fixed to a constant value by the spring 163. Accordingly, the magnet 162 moves in the y direction, and the lens group 12 moves in the y direction.

In this way, in the lens unit 10 on which the lens drive unit 16 including the second lens driving unit and the third lens driving unit is mounted, the magnets 162 and 165 and the lens barrel 15 integrally move in the x direction or the y direction. Accordingly, the lens unit 10 has a structure in which the lens barrel 15 easily moves in the x direction and the y direction by an attractive force applied between the magnets 162 and 165 and a magnetic body if the magnetic body approaches the magnets 162 and 165 from the outside of the lens unit 10.

Figure 4:
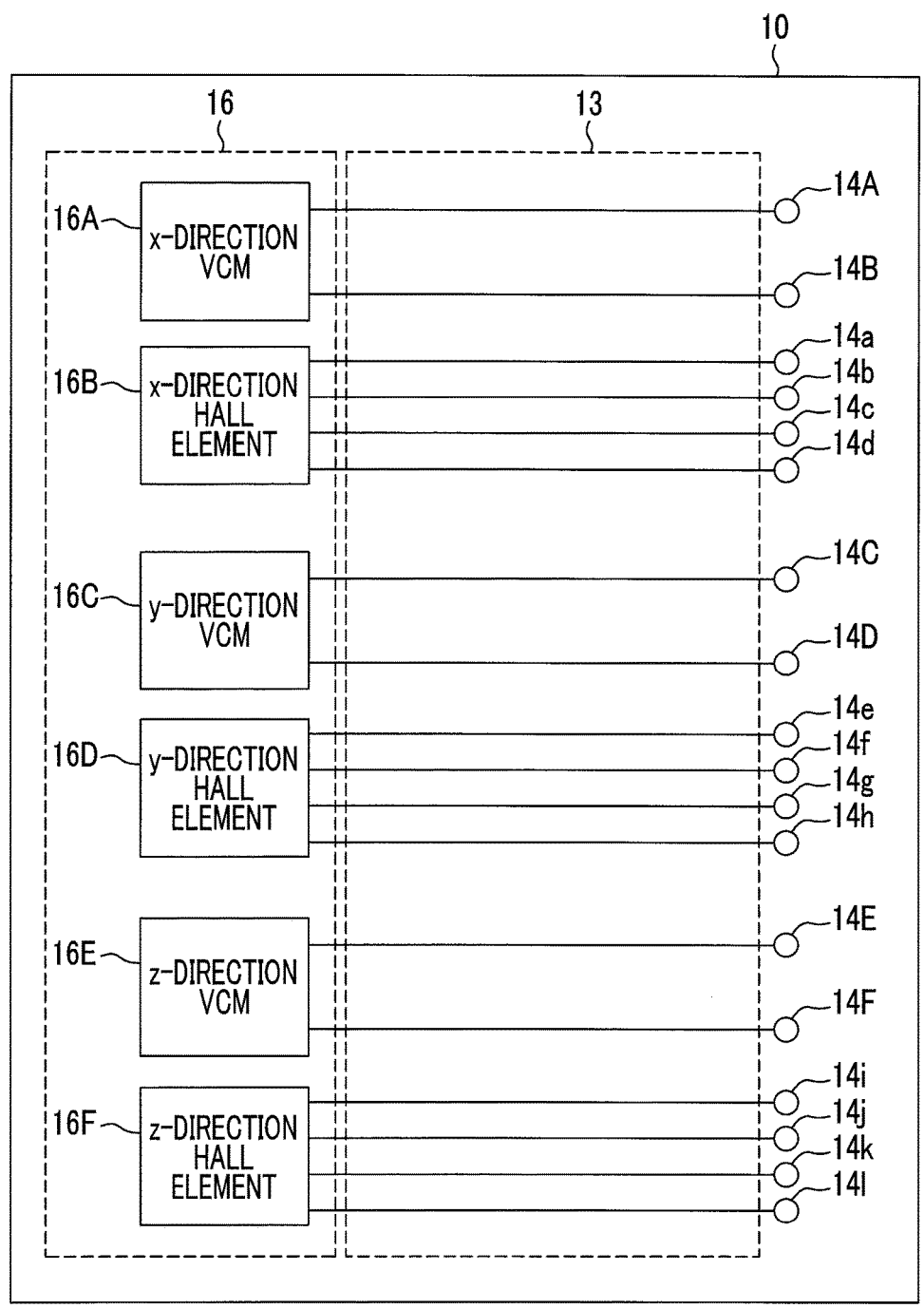
FIG. 4 is a view showing an electric connection configuration inside the lens unit 10 shown in FIG. 2.

FIG. 4 is a block diagram showing an electric connection configuration of the lens unit 10 shown in FIG. 1.

As shown in FIG. 4, the lens drive unit 16 comprises an x-direction VCM 16A (the second lens driving unit) for moving the lens group 12 in the x direction, an x-direction hall element 16B for detecting a position of the lens group 12 in the x direction, a y-direction VCM 16C (the third lens driving unit) for moving the lens group 12 in the y direction, a y-direction hall element 16D for detecting a position of the lens group 12 in the y direction, a z-direction VCM 16E (the first lens driving unit) for moving the lens group 12 in the z direction, and a z-direction hall element 16F for detecting a position of the lens group 12 in the z direction.

Two terminals are formed on the x-direction VCM 16A, and the two terminals are electrically connected to the terminal 14A and the terminal 14B via wires formed on the flexible substrate 13, respectively.

Four terminals are formed on the x-direction hall element 16B, and the four terminals are electrically connected to a terminal 14a, a terminal 14b, a terminal 14c, and a terminal 14d via wires formed on the flexible substrate 13, respectively.

Two terminals are formed on the y-direction VCM 16C, and the two terminals are electrically connected to the terminal 14C and the terminal 14D via wires formed on the flexible substrate 13, respectively.

Four terminals are formed on the y-direction hall element 16D, and the four terminals are electrically connected to a terminal 14e, a terminal 14f, a terminal 14g, and a terminal 14h via wires formed on the flexible substrate 13, respectively.

Two terminals are formed on the z-direction VCM 16E, and the two terminals are electrically connected to the terminal 14E and the terminal 14F via wires formed on the flexible substrate 13, respectively.

Four terminals are formed on the z-direction hall element 16F, and the four terminals are electrically connected to a terminal 14i, a terminal 14j, a terminal 14k, and a terminal 14l via wires formed on the flexible substrate 13, respectively.

In this way, each terminal of the lens unit terminal portion 14 functions as an electric connection portion which is electrically connected to the lens drive unit 16 of the lens unit 10.

In addition, the number of required terminals with respect to each lens driving unit and each hall element is an example, and is not limited to the above-described number.

In the imaging module 100 configured as described above, first, the lens unit 10 and the imaging element unit 20 are separately manufactured. In addition, an adjustment process for positioning the lens unit 10 and the imaging element unit 20 is performed so that an image forming surface of the subject formed by the lens group 12 and an imaging surface of the imaging element 27 are coincident with each other, and thereafter, the lens unit 10 and the imaging element unit 20 are bonded and fixed to each other.

The adjustment process is performed by moving the imaging element unit 20 in a state where a predetermined state of the lens unit 10 is held by a manufacturing apparatus.

Figure 5:
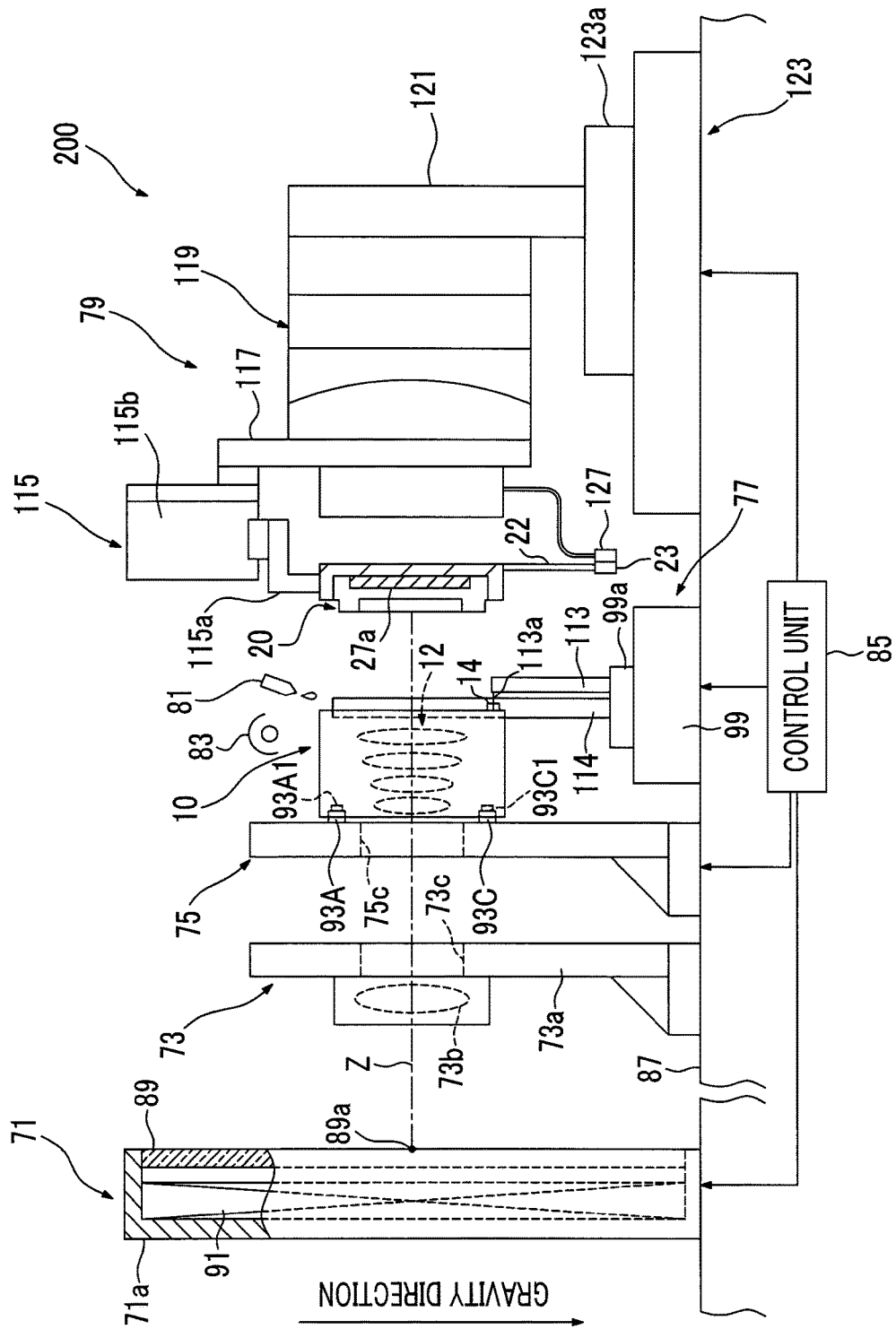
FIG. 5 is a side view showing a schematic configuration of a manufacturing apparatus 200 of the imaging module 100.

FIG. 5 is a side view showing a schematic configuration of the manufacturing apparatus 200 of the imaging module 100.

The imaging module manufacturing apparatus 200 adjusts the position and the inclination of the imaging element unit 20 with respect to the lens unit 10, and the imaging module 100 is completed by fixing the imaging element unit 20 to the lens unit 10 after the adjustment.

The imaging module manufacturing apparatus 200 comprises a chart unit 71, a collimator unit 73, a lens positioning plate 75, a lens holding mechanism 77, an imaging element unit holding portion 79, an adhesive supply portion 81, an ultraviolet lamp 83 which is a light source, and a control unit 85 which controls the above-described components. The chart unit 71, the collimator unit 73, the lens positioning plate 75, the lens holding mechanism 77, and the imaging element unit holding portion 79 are disposed so as to be arranged in one direction on the surface 87 perpendicular to the gravity direction.

The chart unit 71 is configured of a box-shaped housing 71a, a measurement chart 89 which is fitted into the housing 71a, and a light source 91 which is incorporated into the housing 71a and illuminates the measurement chart 89 from the rear surface of the measurement chart 89 with parallel light. For example, the measurement chart 89 is formed of a plastic plate having light diffusibility. The chart surface of the measurement chart 89 is parallel to the gravity direction. The chart unit 71 functions as a measurement chart installation portion for installing the measurement chart. The measurement chart 89 can be removed so as to be replaced with another measurement chart.

Figure 6:
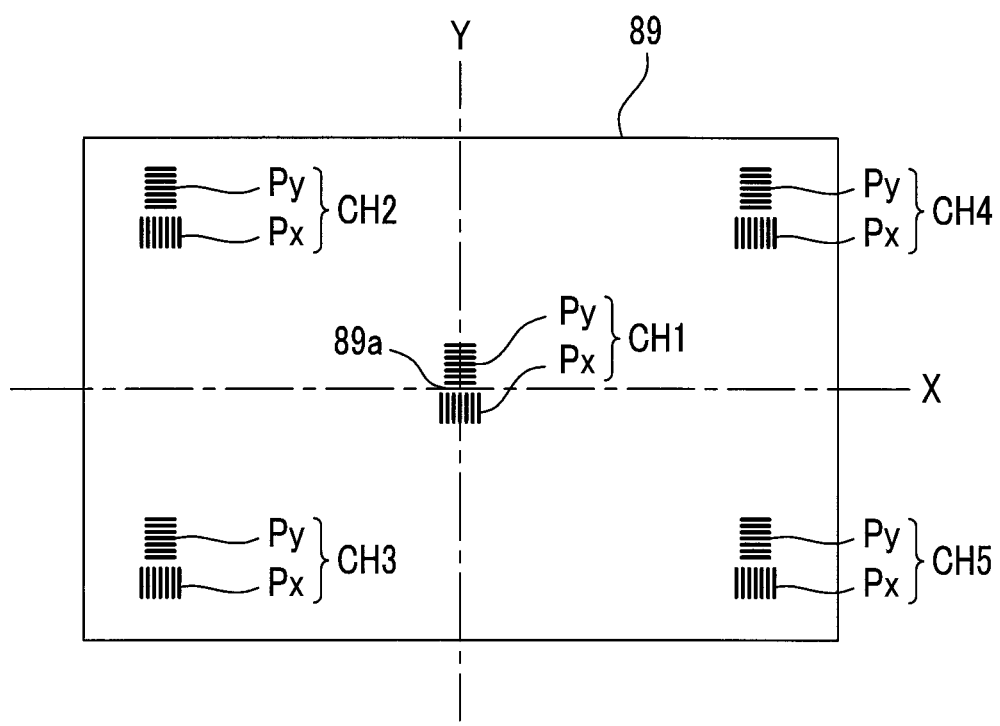
FIG. 6 is a front view of a measurement chart.

FIG. 6 is a view showing the chart surface of the measurement chart 89. The measurement chart 89 is formed in a rectangular shape, and each of a plurality of chart images CH1, CH2, CH3, CH4, and CH5 is printed on the chart surface on which chart patterns are provided.

The plurality of chart images are the same as one another, and are so-called ladder-shaped chart patterns in which black lines are disposed with predetermined intervals therebetween. Each chart image is configured of horizontal chart images Px arranged in a horizontal direction of the image, and vertical chart images Py arranged in a vertical direction of the image.

The collimator unit 73 is disposed to face the chart unit 71 on a Z axis which is a perpendicular line with respect to the chart surface of the measurement chart 89 and is a line passing through a chart surface center 89a.

The collimator unit 73 is configured of a bracket 73a which is fixed to a workbench 87 and a collimator lens 73b.

The collimator lens 73b condenses the light radiated from the chart unit 71, and causes the condensed light to enter the lens positioning plate 75 through an opening 73c formed on the bracket 73a. By adjusting a gap between the chart unit 71 and the collimator unit 73, it is possible to dispose a virtual image position of the measurement chart 89 imaged by the lens unit 10 at an arbitrary distance (for example, an infinity position or a standard subject distance suitable for assumed imaging of the lens unit 10).

The lens positioning plate 75 and the lens holding mechanism 77 configure a lens unit holding portion for holding the lens unit 10 on the Z axis between the chart unit 71 and the imaging element unit holding portion 79.

The lens positioning plate 75 is formed so as to have stiffness, and includes an opening 75c through which light condensed by the collimator unit 73 passes. The lens positioning plate 75 is disposed so as to face the collimator unit 73 on the Z axis.

Figure 7:
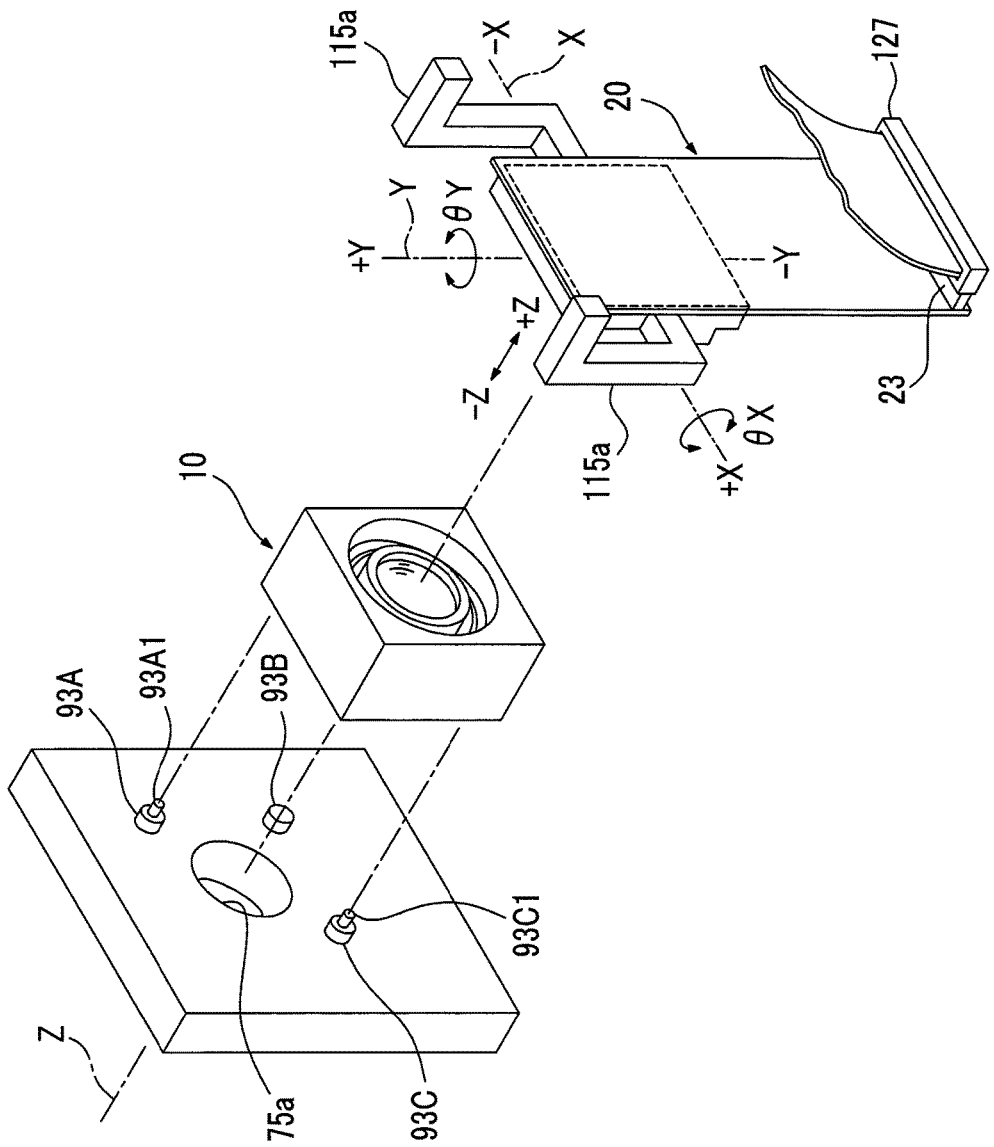
FIG. 7 is an explanatory view showing a state where the lens unit 10 and the imaging element unit 20 are held by the imaging module manufacturing apparatus 200.

FIG. 7 is an explanatory view showing a state where the lens unit 10 and the imaging element unit 20 are held by the imaging module manufacturing apparatus 200.

As shown in FIG. 7, three abutment pins 93A, 93B, and 93C are provided around an opening 75a on the surface of the lens holding mechanism 77 side of the lens positioning plate 75.

Insertion pins 93A1 and 93C1 having smaller diameters than those of the abutment pins are provided on distal ends of two abutment pins 93A and 93C which are disposed on a diagonal line among the three abutment pins 93A, 93B, and 93C.

The abutment pins 93A, 93B, and 93C receive the concave sections 95A, 95B, and 95C of the lens unit 10 shown in FIG. 1, and the insertion pins 93A1 and 93C1 are inserted into the concave sections 95A1 and 95C1 to position the lens unit 10.

In this way, in a state where the lens unit 10 is positioned, the Z axis coincides with the optical axis Ax of the lens unit 10.

Returning to FIG. 5, the lens holding mechanism 77 comprises a first slide stage 99 which is movable in the Z axis direction, and a holding plate 114 and a probe unit 113 which are provided on a stage portion 99a of the first slide stage 99.

The first slide stage 99 is an electric precision stage. In the first slide stage, a ball screw is rotated by rotation of a motor (not shown), and the stage portion 99a which engages with the ball screw moves in the Z axis direction. The first slide stage 99 is controlled by the control unit 85.

The holding plate 114 holds the lens unit 10 such that the top surface of the housing 11 faces the chart unit 71 on the Z axis, and holds the lens unit 10 to the manufacturing apparatus 200 by moving the stage portion 99a in the Z axis direction and pressing the holding plate 114 to the bottom block 19 of the lens unit 10 which is positioned by the lens positioning plate 75.

The probe unit 113 has six probes 113a (only one is shown in FIG. 5).

The first slide stage 99 moves in the Z axis direction, and the contactor of the probe 113a comes into contact with each of the terminals 14A to 14F of the lens unit 10 in a state where the holding plate 114 is pressed to the bottom block 19 of the lens unit 10. The probe unit 113 functions as a first probe pressing portion.

Electricity flows to each of the terminals 14A to 14F via the probe 113a, and the probe unit 113 drives a first lens driving unit (z-direction VCM 16E), a second lens driving unit (x-direction VCM 16A), and a third lens driving unit (y-direction VCM 16C).

Each probe 113a included in the probe unit 113 is a spring type probe, and is configured so as to comprise a contactor for coming into contact with a portion to be contacted, a connector which is electrically connected to a circuit substrate inside the probe unit 113, and an elastic body such as a spring which is provided between the contactor and the connector and biases the contactor. The contactor of the probe 113a is formed of a non-magnetic material. The circuit substrate inside the probe unit 113 is electrically connected to a lens driving driver 145 described below.

The non-magnetic material may include beryllium copper, phosphor bronze, copper-silver alloy, tungsten, or the like. Since non-magnetic metal represented by the beryllium copper has high strength (hardness, toughness), it is possible to thin the contactor. Accordingly, preferably, the non-magnetic metal such as the beryllium copper may be used in a lens unit having a smaller terminal area.

Moreover, the contactor may be configured of a main body which is formed of a non-magnetic material, and a film which is coated on the surface of the main body and is formed of a material different from that of the main body.

For example, after a main body of a contactor is formed of beryllium copper, nickel plating is performed on the surface of the main body, and thereafter, gold plating is performed on the nickel-plated surface, and the contactor is used. Alternatively, after a main body of a contactor is formed of beryllium copper, nickel plating is performed on the surface of the main body, and thereafter, copper plating is performed on the nickel-plated surface, gold plating is performed on the copper-plated surface, and the contactor is used. Alternatively, after a main body of a contactor is formed of beryllium copper, hard gold plating is performed on the surface of the main body, and the contactor is used.

Due to the gold plating, conductivity and wear resistance of the contactor may be improved. In addition, due to the nickel plating, corrosion resistance, conductivity, solder property of the contactor may be improved. Moreover, due to the copper plating, corrosion resistance and conductivity of the contactor may be improved.

Figure 8:
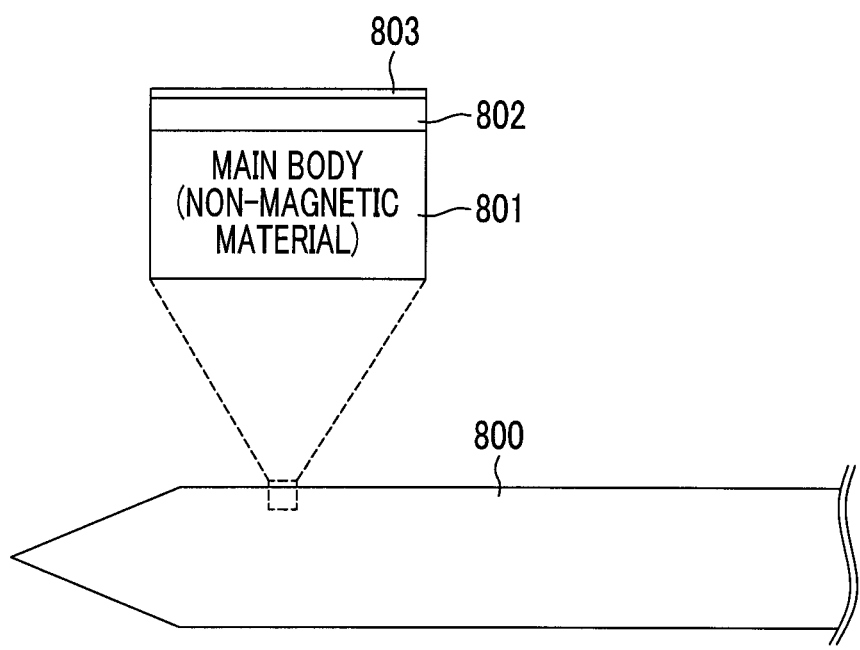

FIG. 8 is a view showing a configuration example of the contactor of the probe 113a.

A contactor 800 shown in FIG. 8 includes a main body 801 which is formed of a non-magnetic material such as beryllium copper, a nickel-plated film 802 which is coated on the surface of the main body 801, and a gold-plated film 803 which is coated on the surface of the nickel-plated film 802.

Preferably, a thickness of the nickel-plated film 802 is 1 μm to 3 μm, and a thickness of the gold-plated film 803 is 0.01 μm to 0.1 μm. Due to the thicknesses, even in a case where the contactor 800 comes into contact with each terminal of the lens unit terminal portion 14, an attractive force which is generated between the magnet inside the lens unit 10 and a magnetic material included in the contactor 800 can be almost eliminated.

The imaging element unit holding portion 79 holds the imaging element unit 20 on the Z axis. In addition, the imaging element unit holding portion 79 can change the position and the inclination of the imaging element unit 20 in the Z axis direction by the control of the control unit 85.

Here, the inclination of the imaging element unit 20 means the inclination of the imaging surface 27a of the imaging element 27 with respect to a plane orthogonal to the Z axis.

The imaging element unit holding portion 79 is configured of a chuck hand 115 which holds the imaging element unit 20 so that the imaging surface 27a faces the chart unit 71 on the Z axis, a biaxial rotation stage 119 which holds an approximately crank-shaped bracket 117 to which the chuck hand 115 is attached, and adjusts the inclination of the imaging element unit 20 around two axes (horizontal X axis and vertical Y axis) orthogonal to the Z axis, and a second slide stage 123 which holds a bracket 121 to which the biaxial rotation stage 119 is attached, and moves the bracket 121 in the Z axis direction.

As shown in FIG. 7, the chuck hand 115 is configured of a pair of holding members 115a which is bent in an approximately crank shape, and an actuator 115b (refer to FIG. 5) which moves the holding members 115a in the X axis direction orthogonal to the Z axis. An outer frame of the imaging element unit 20 in inserted into the portion between the holding members 115a to hold the imaging element unit 20.

In addition, the chuck hand 115 positions the imaging element unit 20 which is held between the holding members 115a so that the optical axis Ax of the lens unit 10 held by the lens unit holding portion including the lens positioning plate 75 and the lens holding mechanism 77, and the center position of the imaging surface 27a are coincident with each other.

In addition, when viewed from the Z axis direction, the chuck hand 115 positions the imaging element unit 20 which is held between the holding members 115a so that each terminal of the imaging element unit terminal portion 24 of the imaging element unit 20 overlaps each terminal of the lens unit terminal portion 14 of the held lens unit 10.

The biaxial rotation stage 119 is an electric twin-axis goino stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage 123, a ball screw is rotated by rotation of a motor (not shown), and a stage portion 123a which engages with the ball screw moves in the Z axis direction. The bracket 121 is fixed to the stage portion 123a.

A connector cable 127, which is connected to the external connection terminal portion 23 provided on the distal end of the flexible substrate 22 of the imaging element unit 20, is attached to the biaxial rotation stage 119. Drive signals are input to the imaging element 27 through the connection cable 127, or captured image signals output from the imaging element 27 are output through the connection cable 127.

The adhesive supply portion 81, and the ultraviolet lamp 83 which is light sources configure a unit fixing portion which fixes the lens unit 10 and the imaging element unit 20.

After the adjustment with respect to the position and the inclination of the imaging element unit 20 with respect to the lens unit 10 ends, the adhesive supply portion 81 supplies an adhesive cured by light (here, as an example, ultraviolet curing type adhesive) to a gap between the lens unit 10 and the imaging element unit 20.

The ultraviolet lamp 83 irradiates the ultraviolet curing type adhesive supplied to the gap with ultraviolet rays, and the adhesive is cured. Moreover, as the adhesive, in addition to the ultraviolet curing type adhesive, an instantaneous adhesive, a thermosetting adhesive, a natural curing adhesive, or the like may be used.

Figure 9:
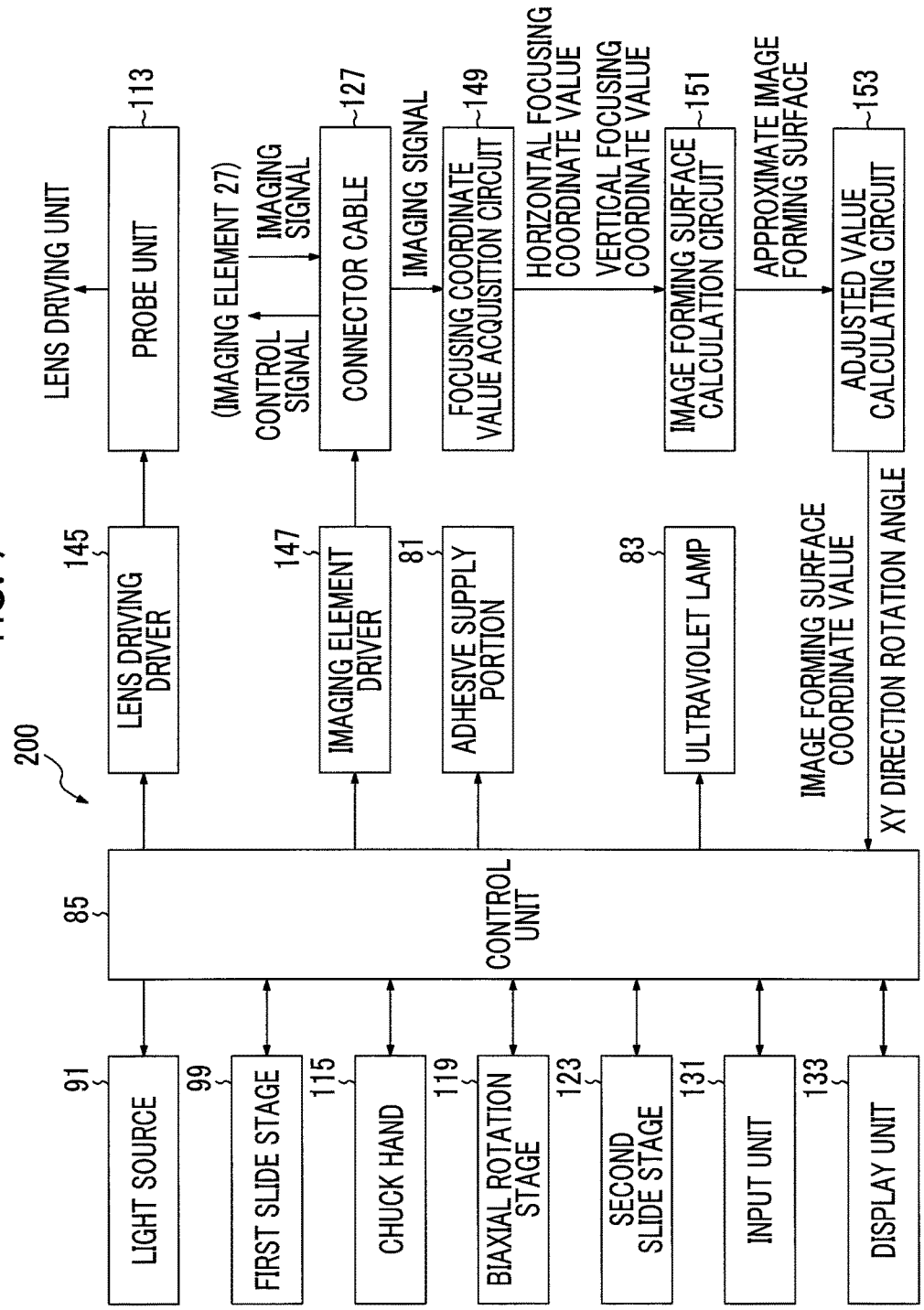
FIG. 9 is a block diagram showing an internal configuration of the imaging module manufacturing apparatus 200.

FIG. 9 is a block diagram showing an internal configuration of the imaging module manufacturing apparatus 200.

For example, the control unit 85 is a microcomputer which comprises a CPU, a ROM, a RAM, or the like, and controls each portion based on a control program stored in the ROM. In addition, an input unit 131 such as a keyboard or a mouse for performing various setting or a display unit 133 on which a setting content, an operation content, operation results, or the like are displayed is connected to the control unit 85.

The lens driving driver 145 is a drive circuit for driving the lens drive unit 16 including the first lens driving unit, the second lens driving unit, and the third lens driving unit, and supplies a driving current to each of the first lens driving unit, the second lens driving unit, and the third lens driving unit via the probe unit 113.

An imaging element driver 147 is a drive circuit for the imaging element 27, and inputs driving signals to the imaging element 27 via the connector cable 127.

A focusing coordinate value acquisition circuit 149 acquires focusing coordinate values at a high focusing degree in the Z axis direction with respect to a plurality of imaging positions (positions corresponding to chart images CH1, CH2, CH3, CH4, and CH5 of the measurement chart 89) which are set on the imaging surface 27a of the imaging element 27.

When the focusing coordinate values at the plurality of imaging positions are acquired, the control unit 85 controls the second slide stage 123 and sequentially moves the imaging element unit 20 to a plurality of measurement positions (Z0, Z1, Z2, . . . ) which are discretely set on the Z axis in advance.

In addition, the control unit 85 controls the imaging element driver 147, and images each chart image of the plurality of chart images CH1, CH2, CH3, CH4, and CH5 of the measurement chart 89, which are formed by the lens group 12 at the measurement positions, on the imaging element 27.

The focusing coordinate value acquisition circuit 149 extracts signals of the pixels corresponding to the plurality of imaging positions from imaging signals input via the connector cable 127, and calculates an individual focusing evaluation value with respect to the plurality of imaging positions from the pixel signals. In addition, the measurement position when a predetermined focusing evaluation value is obtained with respect to each imaging position is set to the focusing coordinate value on the Z axis.

For example, as the focusing evaluation value, a Contrast Transfer Function (hereinafter, referred to as a CTF value) may be used. The CTF value is a value which indicates contrast of an image with respect to spatial frequency, and it is regarded that the focusing degree increases as the CTF value increases.

The focusing coordinate value acquisition circuit 149 calculates the CTF value in each of the plurality of directions set on an XY coordinate plane for each of the plurality of measurement positions (Z0, Z1, Z2, . . . ) set on the Z axis with respect to each of the plurality of imaging positions.

For example, as the direction in which the CTF value is calculated, a lateral direction of the imaging surface 27*a* is set to the horizontal direction (X axis direction), a direction orthogonal to the horizontal direction is set to a vertical direction (Y axis direction), and an X-CTF value and a Y-CTF value which are the CTF values in the directions are calculated.

As a horizontal focusing coordinate value, the focusing coordinate value acquisition circuit 149 acquires coordinates (Zp1, Zp2, Zp3, Zp4, and Zp5) on the Z axis of the measurement position, at which the X-CTF value is the maximum, with respect to the plurality of imaging positions corresponding to the chart images CH1, CH2, CH3, CH4, and CH5. In addition, similarly, as a vertical focusing coordinate value, the focusing coordinate value acquisition circuit 149 acquires the coordinates on the Z axis at the measurement position at which the Y-CTF value is the maximum.

The horizontal focusing coordinate value and the vertical focusing coordinate value of each imaging position acquired from the focusing coordinate value acquisition circuit 149 are input to an imaging forming surface calculation circuit 151.

The image forming surface calculation circuit 151 deploys a plurality of evaluation points, which are expressed by combining an XY coordinate value of each imaging position when the imaging surface 27*a* corresponds to an XY coordinate plane and the horizontal focusing coordinate value and the vertical focusing coordinate value on the Z axis obtained for each imaging position, on a three-dimensional coordinate system in which the XY coordinate plane and the Z axis are combined. In addition, the image forming surface calculation circuit 151 calculates an approximate image forming surface, in which the three-dimensional coordinate system is expressed by one plane, based on relative positions of the evaluation points.

Information of the approximate image forming surface obtained from the image forming surface calculation circuit 151 is input to an adjustment value calculation circuit 153.

The adjustment value calculation circuit 153 calculates an image forming surface coordinate value F1 on the Z axis which is an intersection point between the approximate image forming surface and the Z axis, and XY direction rotation angles which are inclinations of the approximate image forming surface with respect to the XY coordinate plane around the X axis and the Y axis, and inputs the calculated values to the control unit 85.

The control unit 85 drives the biaxial rotation stage 119 and the second slide stage 123 of the imaging element unit holding portion 79 based on the image forming surface coordinate value and the XY direction rotation angles input from the adjustment value calculation circuit 153, adjusts the Z axis direction position and the inclination of the imaging element unit 20, and causes the imaging surface 27*a* to coincide with the approximate image forming surface. The control unit 85 functions as an adjustment portion which adjusts the Z axis direction position and the inclination of the imaging element unit 20 with respect to the lens unit 10.

The above-described imaging module manufacturing apparatus 200 schematically performs the following processes.

(1) A process of holding the lens unit 10 and the imaging element unit 20 on the Z axis orthogonal to the chart surface of the measurement chart 89.

(2) A process of changing the Z axis direction position of the imaging element unit 20 held on the Z axis, driving the imaging element 27 via the electric connection portion in a state where electricity flows to each of the first to third lens driving units of the lens unit 10 held on the Z axis at each position, and imaging the measurement chart 89 by the imaging element 27.

(3) A process of adjusting the position and the inclination of the imaging element unit 20 with respect to the lens unit 10 based on the imaging signals obtained by imaging the measurement chart 89 by the imaging element 27, and fixing the imaging element unit 20 to the lens unit 10.

Hereinafter, details of the manufacturing process of the imaging module 100 performed by the imaging module manufacturing apparatus 200 will be described with reference to a flowchart of FIG. 10.

First, holding (S1) of the lens unit 10 performed by the lens holding mechanism 77 will be described.

The control unit 85 controls the first slide stage 99 so as to move the holding plate 114 along the Z axis direction, and forms a space, in which the lens unit 10 can be inserted, into a portion between the lens positioning plate 75 and the holding plate 114. The lens unit 10 is held by a robot (not shown) and is transferred to the portion between the lens positioning plate 75 and the holding plate 114.

The control unit 85 detects the movement of the lens unit 10 using an optical sensor or the like, and moves the stage portion 99*a* of the first slide stage 99 in the direction approaching the lens positioning plate 75. In addition, the concave sections 95A, 95B, and 95C of the lens unit 10 come into contact with the abutment pins 93A, 93B, and 93C, and the insertion pins 93A1 and 93C1 are inserted into the concave sections 95C1 and 95A1.

Accordingly, the lens unit 10 is positioned in the Z axis direction, the X axis direction, and the Y axis direction. In addition, if the stage portion 99*a* moves in the direction approaching the lens positioning plate 75, the lens unit 10 is interposed between the holding plate 114 and the lens positioning plate 75 such that the lens unit 10 is held.

In the state where the lens unit 10 is held, the contactor of the probe 113*a* of the probe unit 113 comes into contact with the terminals 14A to 14F of the lens unit 10, and the first to third lens driving units and the lens driving driver 145 are electrically connected to each other (S2).

Next, holding (S3) of the imaging element unit 20 performed by the imaging element unit holding portion 79 will be described.

The control unit 85 controls the second slide stage 123 so as to move the biaxial rotation stage 119 along the Z axis direction, and forms a space, in which the imaging element unit 20 can be inserted, into a portion between the lens holding mechanism 77 and the biaxial rotation stage 119. The imaging element unit 20 is held by a robot (not shown) and is transferred to the portion between the lens holding mechanism 77 and the biaxial rotation stage 119.

The control unit 85 detects the movement of the imaging element unit 20 using an optical sensor or the like, and moves the stage portion 123a of the second slide stage 123 in the direction approaching the holding plate 114. In addition, a worker holds the imaging element unit 20 using the holding member 115a of the chuck hand 115. In addition, the connector cable 127 is connected to the external connection terminal portion 23 of the imaging element unit 20. Accordingly, the imaging element 27 and the control unit 85 are electrically connected to each other. Thereafter, the holding of the imaging element unit 20 is released by a robot (not shown).

In this way, after the lens unit 10 and the imaging element unit 20 are held on the Z axis, the horizontal focusing coordinate value and the vertical focusing coordinate value of each imaging position of the imaging surface 27a are acquired by the focusing coordinate value acquisition circuit 149 (S4).

Specifically, the control unit 85 controls the second slide stage 123 so as to move the biaxial rotation stage 119 in the direction approaching the holding plate 114, and moves the imaging element unit 20 to an initial measurement position at which the imaging element 27 is closest to the lens unit 10.

The control unit 85 causes the light source 91 of the chart unit 71 to emit light. In addition, the control unit 85 inputs the driving signals from the lens driving driver 145 to the terminals 14A to 14F so as to drive the first to third lens driving units, and holds the x direction position, the y direction position, and the z direction position of the optical axis Ax of the lens group 12 to a reference position (for example, initial position when actually used).

Next, the control unit 85 controls the imaging element driver 147 so as to image the chart images CH1, CH2, CH3, CH4, and CH5 formed by the lens unit 10 on the imaging element 27. The imaging element 27 inputs the captured imaging signals to the focusing coordinate value acquisition circuit 149 via the connector cable 127.

The focusing coordinate value acquisition circuit 149 extracts the signals of the pixel at the imaging position corresponding to each of the chart images CH1, CH2, CH3, CH4, and CH5 from the input imaging signals, and calculates the X-CTF value and the Y-CTF value with respect to each imaging position from the pixel signals. For example, the control unit 85 stores the information of the X-CTF value and the Y-CTF value in the RAM in the control unit 85.

The control unit 85 sequentially moves the imaging element unit 20 to the plurality of measurement positions (Z0, Z1, Z2, . . . ) set along the Z axis direction, and images the chart image of the measure chart 89 on the imaging element 27 at each measurement position in the state where the x direction position, the y direction position, and the z direction position of the optical axis Ax of the lens group 12 are held to the reference positions. The focusing coordinate value acquisition circuit 149 calculates the X-CTF value and the Y-CTF value at the imaging position of each measurement position.

The focusing coordinate value acquisition circuit 149 selects the maximum value among the plurality of calculated X-CTF values and Y-CTF values with respect to each imaging position, and acquires the Z axis coordinate of the measurement position, at which the maximum value is obtained, as the horizontal focusing coordinate value and the vertical focusing coordinate value at the imaging position.

The horizontal focusing coordinate value and the vertical focusing coordinate value acquired by the focusing coordinate value acquisition circuit 149 are input to the imaging forming surface calculation circuit 151. For example, the image forming surface calculation circuit 151 calculates an approximately planarized approximate image forming surface F using a least square method (S6).

The information of the approximate image forming surface F calculated by the imaging forming surface calculation circuit 151 is input to the adjustment value calculation circuit 153. The adjustment value calculation circuit 153 calculates the image forming surface coordinate value F1 which is the intersection point between the approximate image forming surface F and the Z axis, and the XY direction rotation angles which are the inclinations of the approximate image forming surface with respect to the XY coordinate plane around the X axis and the Y axis, and inputs the calculated value and angles to the control unit 85 (S7).

The control unit 85 controls the biaxial rotation stage 119 and the second slide stage 123 based on the image forming surface coordinate value F1 and the XY direction rotation angles, and moves the imaging element unit 20 in the Z axis direction such that the center position of the imaging surface 27a of the imaging element 27 is coincident with the image forming surface coordinate value F1. In addition, the control unit 85 adjusts angles of the imaging element unit 20 in the θx direction and the θy direction such that the inclination of the imaging surface 27a is coincident with the approximate image forming surface F (S8).

The control unit 85 performs a confirmation process which confirms the focusing position of each imaging position after the position and the inclination of the imaging element unit 20 are adjusted (S9).

In this confirmation process, each process of the above-described S4 is performed again. After the position and the inclination of the imaging element unit 20 are adjusted, variation of evaluation values corresponding to the horizontal direction and the vertical direction with respect to each of the imaging positions decreases.

After the confirmation process (S9) ends (S5: YES), the control unit 85 moves the imaging element unit 20 in the Z axis direction such that the center position of the imaging surface 27a is coincident with the image forming surface coordinate value F1 (S10).

In addition, the control unit 85 supplies the ultraviolet curing adhesive from the adhesive supply portion 81 to the gap between the lens unit 10 and the imaging element unit 20 (S11), and cures the ultraviolet curing type adhesive by lighting the ultraviolet lamp 83 (S12).

After the adhesive is cured and the lens unit 10 and the imaging element unit 20 are fixed to each other, the control unit 85 moves the stage portion 99a to the imaging element unit holding portion 79 side, and contact between the contactor of the probe 113a and each of the terminals 14A to 14F of the lens unit 10 is released (S13). Thereafter, the completed imaging module 100 is discharged from the imaging module manufacturing apparatus 200 by a robot (not shown) (S14).

In addition, the lens unit 10 and the imaging element unit 20 are fixed by the ultraviolet curing type adhesive. However, the curing of the ultraviolet curing type adhesive may be used for temporary fixation between the lens unit 10 and the imaging element unit 20.

For example, in a state where the lens unit 10 and the imaging element unit 20 are temporarily fixed to each other, the imaging module 100 is discharged from the imaging module manufacturing apparatus 200, a desired process such as cleaning processing is performed, and thereafter, the lens unit 10 and the imaging element unit 20 may be completely fixed to each other by a thermosetting type adhesive or the like.

In general, the contactor of the probe for allowing electricity to flow to an electronic circuit or the like is configured of a magnetic material. However, if the contactor of the probe 113a is configured of a magnetic material, an attractive force is generated between the magnets 162 and 165 inside the lens unit 10 and the contactor of the probe 113a, and the lens barrel 15 may be held by the manufacturing apparatus 200 in a state where the optical axis Ax of the lens barrel 15 is deviated from desired positions in the x direction and the y direction.

In the above-described manufacturing apparatus 200, the positioning of the lens unit 10 and the imaging element unit 20 is performed in a state where the contactor of the probe 113a configured of a non-magnetic material comes into contact with the terminals 14A to 14F of the lens unit 10, and electricity flows to the lens drive unit 16 of the lens unit 10.

Accordingly, when the contactor of the probe 113a comes into contact with the terminals 14A to 14F of the lens unit 10, an attractive force is not applied to the portion between the contactor of the probe 113a and the magnets 162 and 165, and it is possible to prevent the magnets 162 and 165 from moving in the x direction and the y direction. Therefore, the optical axis Ax and the Z axis can coincide with each other when the lens unit 10 is held, and it is possible to perform positioning of the lens unit 10 and the imaging element unit 20 with high accuracy.

In a case where magnetic forces of the magnets 162 and 165 used in the lens unit 10 or weight of the lens barrel 15 used in the lens unit 10, volume ratios of all probes 113a coming into contact with the lens unit 10 with respect to the magnets 162 and 165 having volumes matching with the probes, a modulus of elasticity of the spring 163 used in the lens drive unit 16, or the like is designed within a range which is generally considered, with respect to the lens unit 10 in which the minimum distance among distances of straight lines which connect the centers of the terminals 14A to 14F exposed from the housing 11 of the lens unit 10 and the magnets 162 and 165 is 1.5 mm or less, deviation of the optical axis Ax of the lens group 12 increases to an extent in which the deviation is not allowable if the contactor of the probe 113a is formed of a magnetic material.

In recent years, since a decrease in size of the lens unit 10 is required, it is difficult to set the minimum distance to a distance which is larger than 1.5 mm. Accordingly, even when the probe 113a is a small, the magnets 162 and 165 are attracted by the probe 113a, and optical axis Ax may move. Therefore, the contactor of the probe, which is configured of a general magnetic material, is required to be formed of a non-magnetic material, and the configuration of the probe 113a described in the present embodiment is effective.

In JP2009-210443A, a technology premised on a spring type probe is not described, but a technology premised on a probe using a metal spring wire is described, and a non-magnetic material such as beryllium copper is used as the material of the metal spring wire. In the probe disclosed in JP2009-210443A, the probe is pressed to an electrode, which is an object to be energized, using an elastic force generated by bending the probe having spring properties.

In the manufacturing apparatus 200 of the present embodiment, if a method of pressing the probe to the terminals 14A to 14F of the lens unit 10 using an elastic force generated by bending the probe having spring properties is adopted, the lens unit 10 may move due to the pressing force of the probe. In order to prevent the lens unit 10 from moving due to the pressing force of the probe, it is necessary to increase a holding force of the lens unit 10, and a cost of the manufacturing apparatus 200 increases.

In the manufacturing apparatus 200, since a spring type probe 113a is used, it is possible to decrease a force applied to the lens unit 10 during probing. Accordingly, it is not necessary to increase the holding force of the lens unit 10, and it is possible to prevent the cost of the manufacturing apparatus 200 from increasing.

Moreover, in a case where the contactor of the probe 113a is configured of the main body which is formed of a non-magnetic material and the film which is coated on the surface of the main body and is formed of a material different from that of the main body, even when the material of the coated film includes a magnetic material, a ratio of the volume of the coated film with respect to the volume of the main body is sufficiently small. Accordingly, it is possible to prevent occurrence of the attractive force between the probe 113a and the magnet.

Hereinbefore, the manufacturing apparatus for manufacturing the lens unit 10 having the first to third lens driving units is described. However, even when only the second lens driving unit and the third lens driving unit are mounted on the lens unit 10, it is possible to perform positioning with high accuracy by allowing electricity to flow to the lens unit 10 using the above-described method.

Like the imaging module 100, in the case where the first to third lens driving units are mounted on the lens unit 10, the number of the terminals used for allowing electricity to flow to the lens drive unit 16 may be larger than the number of the terminals of the lens unit on which only the second lens driving unit and the third lens driving unit are mounted. That is, since the volume ratio of the probes with respect to the magnets inside the lens unit 10 increases, adopting the probe 113a including the contactor formed of a non-magnetic material is particularly effective.

Moreover, hereinbefore, it is possible to perform the positioning with high accuracy by driving the first to third lens driving units included in the lens unit 10. However, in order to further increase accuracy, the measurement chart 89 may be imaged by the imaging element 27 at each measurement position in a state where electricity also flows to the hall element included in the lens drive unit 16.

In the case where electricity also flows to the hall element included in the lens drive unit 16, at most 18 probes are necessary. Accordingly, in a case where the probe 113a is configured of a magnetic material, the attractive force applied to the portion between the magnet inside the lens unit 10 and the probe increases. Therefore, adopting the probe 113a including the contactor formed of a non-magnetic material is particularly effective.

Figure 10:
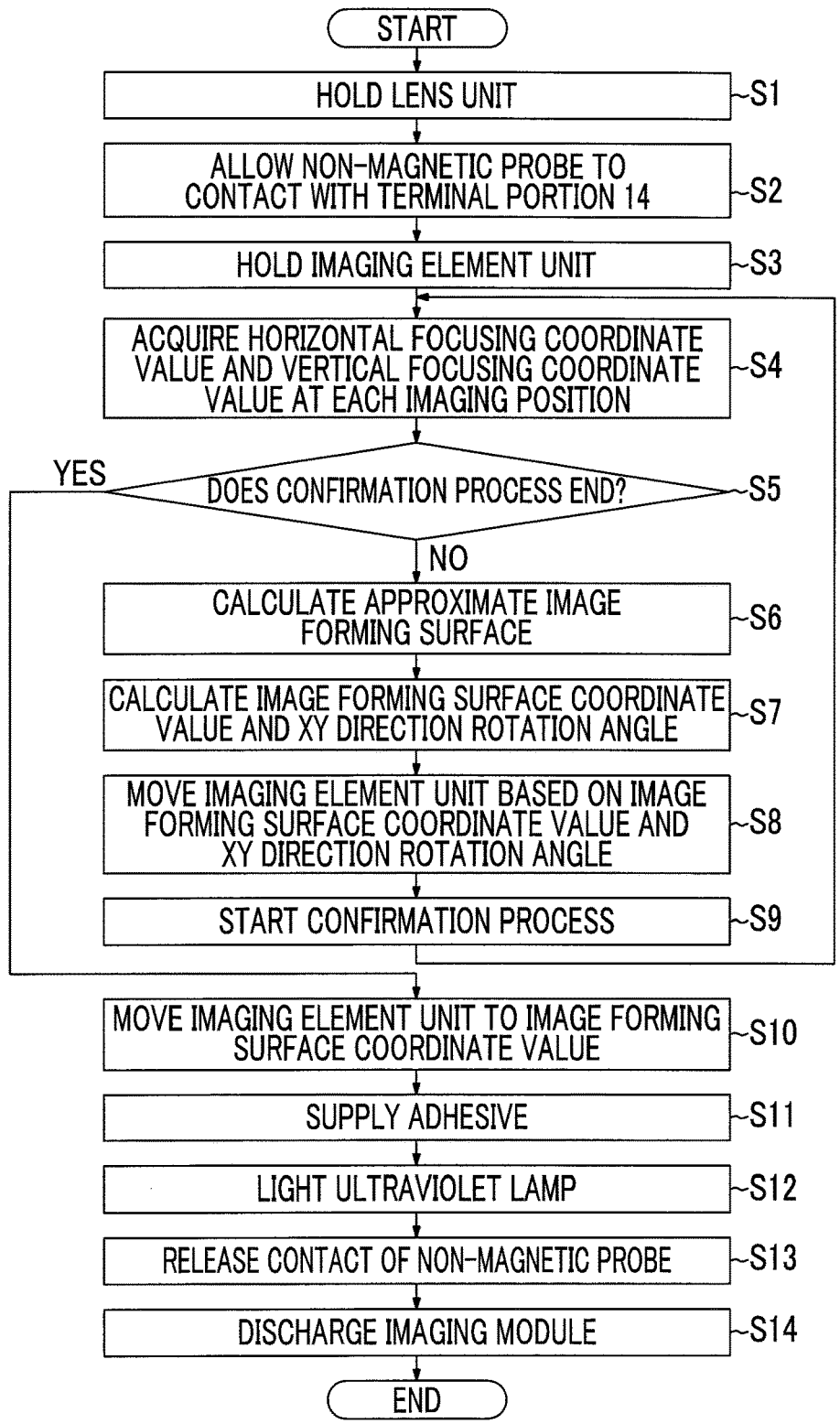
FIG. 10 is a flowchart for explaining a manufacturing process of the imaging module performed by the imaging module manufacturing apparatus 200.

In addition, in the process of S4 in FIG. 10, in a state where the lens unit holding portion including the lens positioning plate 75 and the lens holding mechanism 77 is movable in the Z axis direction, the measurement positions are changed by moving the lens unit holding portion in the Z axis direction in a state where the position of the imaging element unit holding portion 79 in the Z axis direction is fixed, or by moving each of the lens unit holding portion and the imaging element unit holding portion 79 in the Z axis direction, and the focusing coordinate value may be acquired at each measurement position.

Moreover, in a state where the positions of the lens unit holding portion and the imaging element unit holding portion 79 in the Z axis direction are fixed, the measurement positions are changed by moving the chart unit 71 in the Z axis direction, and the focusing coordinate value may be acquired. In addition, the measurement positions are changed by changing the positions of the lens unit holding portion, the imaging element unit holding portion 79, and the chart unit 71 in the Z axis direction, and the focusing coordinate value may be acquired.

That is, the measurement positions are changed by changing relative positions of the lens unit 10, the imaging element unit 20, and the measurement chart 89 in the Z axis direction, the measurement chart 89 is imaged by the imaging element 27 at each relative position, and the focusing coordinate value may be acquired.

Moreover, in the descriptions of FIG. 10, the plurality of measurement positions are realized by changing the relative positions, and the measurement chart is imaged when the relative position reaches each measurement position. However, the imaging of the measurement chart is continuously performed (that is, motion picture imaging is performed), and the relative position may be changed such that the relative position reaches each measurement position during imaging.

Moreover, in the process of S8 in FIG. 10, the position of the imaging element unit 20 in the Z axis direction with respect to the lens unit 10 is adjusted by moving the imaging element unit 20 in a state where the position of the lens unit 10 in the Z axis direction is fixed. As a modification example with respect to this, in a state where the lens unit holding portion is movable in the Z axis direction, the positional adjustment may be performed by moving the lens unit holding portion in a state where the position of the imaging element unit holding portion 79 is fixed or by moving each of the lens unit holding portion and the imaging element unit holding portion 79.

Moreover, in the process of S8 in FIG. 10, the position and the inclination in the Z axis direction of the imaging element unit 20 with respect to the lens unit 10 are adjusted. However, the adjustment of the position in the Z axis direction may be omitted. For example, if the lens barrel 15 in the lens unit 10 has a screw structure so as to be slidable in the optical axis Ax direction, the adjustment of the position of the manufacturing apparatus 200 in the Z axis direction may be not performed.

In this way, in the manufacturing apparatus in which the process of adjusting at least the inclination of the imaging element unit 20 with respect to the lens unit 10 is performed, it is possible to perform positioning with high accuracy by using the probe 113*a* which is formed of a non-magnetic material as described above.

Moreover, in the process of S8 in FIG. 10, if the position and the inclination in the Z axis direction of the imaging element unit 20 with respect to the lens unit 10 are adjusted, at least three chart images may be provided on the chart surface of the measurement chart 89.

As described above, in the case where four or more chart images are used, it is possible to perform the inclination adjustment of the imaging element unit 20 with respect to the lens unit 10 with higher accuracy.

In a case where electricity flows to the lens unit 10, the lens driving units which are objects to be energized need not be all of the first to third lens driving units, and electricity may flow to only the necessary lens driving unit according to the positioning accuracy.

Figure 11:
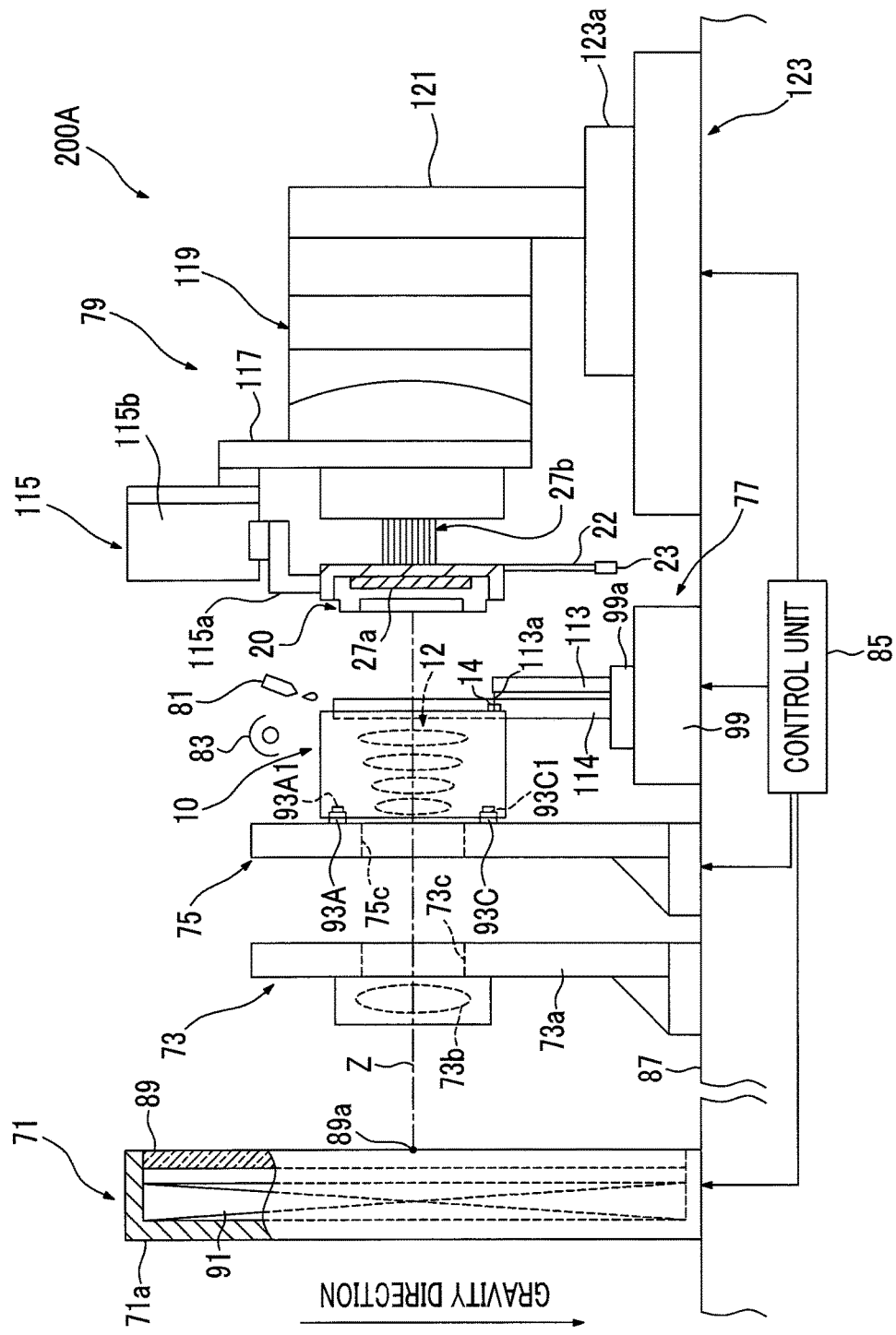
FIG. 11 is a view showing a modification example of the imaging module manufacturing apparatus 200.

FIG. 11 is a view showing a modification example of the manufacturing apparatus 200 shown in FIG. 5.

A manufacturing apparatus 200A shown in FIG. 11 is the same as the manufacturing apparatus 200 shown in FIG. 5 except that the electric connection between the imaging element 27 of the imaging element unit 20 and the imaging element drive 147 is performed not using the external connection terminal portion 23 of the imaging element unit 20 but using the probe 27*b*.

In the imaging element unit 20 which is held to the imaging element unit holding portion 79 by the manufacturing apparatus 200A, the plurality of electric connection portions such as the data output terminal and the drive terminal of the imaging element 27 which are electrically connected to the imaging element 27 are exposed from the rear surface of the substrate 21.

The plurality of probes 27*b* are provided in the biaxial rotation stage 119, and each of the plurality of probes 27*b* is electrically connected to the imaging element driver 147.

In a state where a worker holds the imaging element unit 20 to the apparatus using the holding members 115*a* of the chuck hand 115, any one of the plurality of probes 27*b* is pressed to each terminal exposed from the rear surface of the substrate 21 of the imaging element 27, and the imaging element 27 and the imaging element driver 147 are electrically connected to each other. In the manufacturing apparatus 200A of FIG. 11, the probe unit 113 functions as the first probe pressing portion, and the biaxial rotation stage 119 functions as the second probe pressing portion.

In the manufacturing apparatus 200A, each of the plurality of probes 27*b* has the same configuration as that of the probe 113*a*. Accordingly, even in a state where the imaging element unit 20 held by the imaging element unit holding portion 79 approaches the position closest to the lens unit 10, the magnet inside the lens unit 10 is not attracted to the plurality of probes 27*b*. Accordingly, it is possible to maintain the position of the lens group 12 of the lens unit 10 in a desired state, and it is possible to perform the positioning of the lens unit 10 and the imaging element unit 20 with high accuracy.

In the manufacturing apparatuses shown in FIGS. 5 and 11, the lens unit 10 is held on the Z axis by allowing the concave sections 95A, 95B, and 95C of the lens unit 10 to come into contact with the abutment pins 93A, 93B, and 93C of the lens positioning plate 75 and pressing the lens unit 10 to the lens positioning plate 75 side by the holding plate 114.

Figure 12:
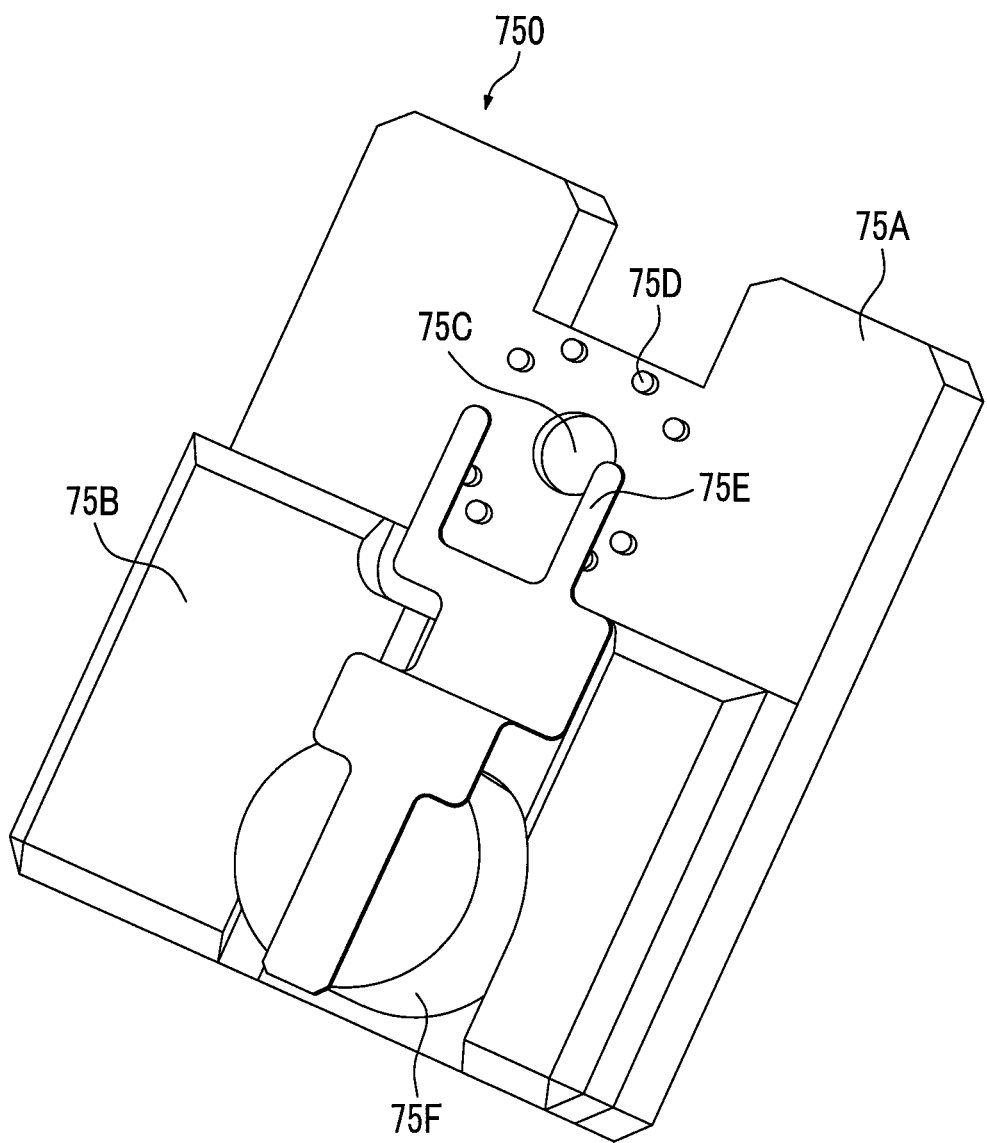
FIG. 12 is an external perspective view of an external setup tool.

As a modification example with respect to this, using an external setup tool shown in FIG. 12, the lens unit 10 may be held on the Z axis by attaching the external setup tool to a plate disposed on the Z axis.

FIG. 12 is an external perspective view of the external setup tool.

A tool 750 (first tool) shown in FIG. 12 comprises a substrate 75A, and a convex section 75B which is formed on a substrate 75A.

An opening 75C is provided on the substrate 75A. Eight protrusions 75D are formed around the opening 75C of the substrate 75A. The eight protrusions 75D position the top surface 11*a* of the housing 11 of the lens unit 10.

A partial concave section is formed on the convex section 75B, and a rotatable pedestal 75F is formed on the concave section.

A lens unit pressing portion 75E for pressing the lens unit 10 disposed within a range defined by eight protrusions 75D of the substrate 75A is formed on the pedestal 75F.

If a worker rotates the pedestal 75F to the left and the lens unit pressing portion 75E is rotated left at 90° from the state of FIG. 12, a space is generated on the upper portion of the range defined by the eight protrusions 75D of the substrate 75A. In this state, the worker disposes the top surface 11*a* of the housing 11 of the lens unit 10 in the range defined by the eight protrusions 75D. In addition, if the worker rotates the pedestal 75F to the right and the lens unit pressing portion 75E is brought into the state of FIG. 12, the lens unit pressing portion 75E presses the lens unit 10 to the substrate 75A side, and the lens unit 10 is held by the tool 750.

In the manufacturing apparatuses 200 and 200A, a plate (second tool) capable of attaching and detaching the tool 750 is disposed at a position at which the lens positioning plate 75 is to be disposed on the Z axis. In addition, the lens unit 10 is held on the Z axis by attaching the tool 750 to the plate using a robot. In this state, by moving the stage portion 99a and allowing the probe 113a to come into contact with each terminal of the lens unit 10, electricity can flow to the lens drive unit 16 of the lens unit 10.

In the tool 750, by forming all materials (a material of the substrate 75A, a material of the convex section 75B, a material of the protrusion 75D, a material of the pedestal 75F, and a material of the lens unit pressing portion 75E) configuring the tool 750 in non-magnetic materials, it is possible to prevent deviation in the position of the optical axis Ax due to using of the tool 750. As the non-magnetic materials used in the tool 750, austenitic stainless steel, aluminum, copper, copper alloy, brass, or the like may be used.

Moreover, in the tool 750, a surface treatment such as plating may be performed on all components configuring the tool 750. That is, the tool 750 may be configured of a main body formed of a non-magnetic material, and a film which is coated on the surface of the main body and is formed of a material different from that of the main body.

In a case where a stainless steel base material is used as the non-magnetic material, a Raydent treatment or a Raydent H treatment may be performed. In a case where an aluminum base material is used as the non-magnetic material, a black alumite treatment or a hard black alumite treatment may be performed.

By performing the surface treatment on the tool 750, it is possible to improve durability of the tool. In addition, it is possible to prevent reflection of light on the surface of the tool 750, occurrence of ghost, flare, or the like on a captured image is prevented, and it is possible to improve the positioning accuracy of the lens unit 10 and the imaging element unit 20.

In this way, according to the configuration of the apparatus in which the lens unit 10 is held on the Z axis using the tool 750, when a different imaging module is manufactured by the manufacturing apparatus, the lens unit 10 of the next product can be prepared. Accordingly, it is possible to increase the manufacturing efficiency of the imaging module.

As described above, the present specification describes the following matters.

In a disclosed manufacturing method of an imaging module having a lens unit which has a lens group, and an imaging element unit which is fixed to the lens unit and has an imaging element which images a subject through the lens group, in which the lens unit has a lens drive unit which includes two lens driving units which respectively move at least a portion of lenses of the lens group in two directions orthogonal to an optical axis of the lens group, a housing which accommodates the lens group and the lens drive unit, and an electric connection portion which is exposed from the housing and is electrically connected to the lens drive unit, the two lens driving units have voice coils and magnets facing the voice coils, and the manufacturing method comprises: a first process of, on an axis orthogonal to a measurement chart, changing relative positions of at least one or more of the imaging element unit, the lens unit, and the measurement chart in the direction of the axis, and driving the imaging element and imaging the measurement chart through the lens group by the imaging element at each relative position; and a second process of adjusting at least an inclination of the imaging element unit with respect to the lens unit based on imaging signals obtained by imaging the measurement chart by the imaging element, and fixing the imaging element unit to the lens unit, and in the first process, the lens unit is held on the axis, and the measurement chart is imaged by the imaging element in a state where a contactor of a first probe having the contactor including a main body formed of a non-magnetic material is pressed to the electric connection portion of the lens unit and electricity flows to the lens drive unit.

In the disclosed manufacturing method of an imaging module, the first probe comprises the contactor, and an elastic body which biases the contactor.

In the disclosed manufacturing method of an imaging module, the non-magnetic material is a non-magnetic metal.

In the disclosed manufacturing method of an imaging module, the contactor is configured of the main body, and a film which is coated on a surface of the main body and is formed of a material different from a material of the main body.

In the disclosed manufacturing method of an imaging module, the shortest distance among distances between the electric connection portion and the magnets in the lens unit is 1.5 mm or less.

In the disclosed manufacturing method of an imaging module, in the first process, the imaging element unit is held on the axis, and the measurement chart is imaged by the imaging element in a state where a contactor of a second probe having the contactor including a main body formed of a non-magnetic material is pressed to an electric connection portion which is provided in the imaging element unit and is electrically connected to the imaging element, and electricity flows to the imaging element.

In the disclosed manufacturing method of an imaging module, in the first process, the lens unit is held on the axis by disposing a tool formed of a non-magnetic material, to which the lens unit is attached, on the axis.

In the disclosed manufacturing method of an imaging module, the tool is configured of a main body formed of a non-magnetic material, and a film which is coated on a surface of the main body and is formed of a material different from that of the main body.

A disclosed imaging module manufacturing apparatus, comprises: a measurement chart installation portion for installing a measurement chart; an imaging element unit holding portion for holding an imaging element unit having an imaging element which images a subject through a lens unit having a lens group, on an axis orthogonal to the measurement chart installed on the measurement chart installation portion; a lens unit holding portion for holding the lens unit on the axis between the measurement chart installation portion and the imaging element unit holding portion; a first probe pressing portion which presses a contactor of a first probe having the contactor including a main body formed of a non-magnetic material to the lens unit held by the lens unit holding portion; a control unit which changes relative positions of at least one or more of the measurement chart installation portion, the lens unit holding portion, and the imaging element unit holding portion in the direction of the axis, and drives the imaging element of the imaging element unit and images the measurement chart through the lens unit by the imaging element at each relative position; an adjustment portion which adjusts at least an inclination of the imaging element unit with respect to the lens unit based on imaging signals obtained by imaging the measurement chart by the imaging element; and a unit fixing portion which fixes the imaging element unit adjusted by the adjustment portion to the lens unit.

In the disclosed imaging module manufacturing apparatus, the first probe comprises the contactor, and an elastic body which biases the contactor.

In the disclosed imaging module manufacturing apparatus, the non-magnetic material is a non-magnetic metal.

In the disclosed imaging module manufacturing apparatus, the contactor is configured of the main body, and a film which is coated on a surface of the main body and is formed of a material different from a material of the main body.

In the disclosed imaging module manufacturing apparatus, the first probe pressing portion presses the contactor of the first probe to an electric connection portion which is included in the lens unit held by the lens unit holding portion, is electrically connected to a lens drive unit including a voice coil and a magnet which configure two lens driving units respectively moving at least a portion of lenses of the lens group in two directions orthogonal to an optical axis of the lens group, and is exposed from a housing which accommodates the lens group and the lens drive unit, and the imaging module manufacturing apparatus further comprises a second probe pressing portion which presses a contactor of a second probe having the contactor including a main body formed of a non-magnetic material to an electric connection portion which is provided in the imaging element unit held by the imaging element unit holding portion and is electrically connected to the imaging element.

In the disclosed imaging module manufacturing apparatus, the lens unit holding portion comprises a second tool which is configured to attach and detach a first tool formed of a non-magnetic material for attaching the lens unit, and is disposed on the axis.

In the disclosed imaging module manufacturing apparatus, the first tool is configured of a main body formed of a non-magnetic material, and a film which is coated on a surface of the main body and is formed of a material different from a material of the main body.

INDUSTRIAL APPLICABILITY

A manufacturing method of an imaging module and an imaging module manufacturing apparatus of the present invention are particularly effectively applied to manufacturing of an imaging module which is mounted on an electric device such as a portable phone, a spectacle type electronic device, or a wrist watch type electronic device.

Hereinbefore, the present invention is described according to specific embodiments. However, the present invention is not limited to the embodiments, and various modifications may be applied within a scope which does not depart from a technical idea of the disclosed invention.

What is claimed is:

1. A manufacturing method of an imaging module having a lens unit which has a lens group, and an imaging element unit which is fixed to the lens unit and has an imaging element which images a subject through the lens group,
    wherein the lens unit has a lens drive unit which includes two lens driving units which respectively move at least a portion of lenses of the lens group in two directions orthogonal to an optical axis of the lens group, a housing which accommodates the lens group and the lens drive unit, and an electric connection portion which is exposed from the housing and is electrically connected to the lens drive unit,
    wherein the two lens driving units have voice coils and magnets facing the voice coils,
    wherein the manufacturing method comprises:
    a first process of, on an axis orthogonal to a measurement chart, changing relative positions of at least one or more of the imaging element unit, the lens unit, and the measurement chart in the direction of the axis, and driving the imaging element and imaging the measurement chart through the lens group by the imaging element at each relative position; and
    a second process of adjusting at least an inclination of the imaging element unit with respect to the lens unit based on imaging signals obtained by imaging the measurement chart by the imaging element, and fixing the imaging element unit to the lens unit, and
    wherein in the first process, the lens unit is held on the axis, and the measurement chart is imaged by the imaging element in a state where a contactor of a first probe having the contactor including a main body formed of a non-magnetic material is pressed to the electric connection portion of the lens unit and electricity flows to the lens drive unit.

2. The manufacturing method of an imaging module according to claim 1,
    wherein the first probe comprises the contactor, and an elastic body which biases the contactor.

3. The manufacturing method of an imaging module according to claim 1,
    wherein the non-magnetic material is a non-magnetic metal.

4. The manufacturing method of an imaging module according to claim 2,
    wherein the non-magnetic material is a non-magnetic metal.

5. The manufacturing method of an imaging module according to claim 3,
    wherein the contactor is configured of the main body, and a film which is coated on a surface of the main body and is formed of a material different from a material of the main body.

6. The manufacturing method of an imaging module according to claim 4,
    wherein the contactor is configured of the main body, and a film which is coated on a surface of the main body and is formed of a material different from a material of the main body.

7. The manufacturing method of an imaging module according to claim 1,
    wherein the shortest distance among distances between the electric connection portion and the magnets in the lens unit is 1.5 mm or less.

8. The manufacturing method of an imaging module according to claim 1,
    wherein in the first process, the imaging element unit is held on the axis, and the measurement chart is imaged by the imaging element in a state where a contactor of a second probe having the contactor including a main body formed of a non-magnetic material is pressed to an electric connection portion which is provided in the imaging element unit and is electrically connected to the imaging element, and electricity flows to the imaging element.

9. The manufacturing method of an imaging module according to claim 1,
    wherein in the first process, the lens unit is held on the axis by disposing a tool formed of a non-magnetic material, to which the lens unit is attached, on the axis.

10. The manufacturing method of an imaging module according to claim 9,
wherein the tool is configured of a main body formed of a non-magnetic material, and a film which is coated on a surface of the main body and is formed of a material different from that of the main body.

* * * * *